(12) United States Patent
Tsai et al.

(10) Patent No.: US 11,086,459 B2
(45) Date of Patent: Aug. 10, 2021

(54) TOUCH PANEL AND MANUFACTURING METHOD THEREOF

(71) Applicant: Cambrios Film Solutions Corporation, Tortola (VG)

(72) Inventors: Yi-Chen Tsai, Chiayi (TW); Wei-Chia Fang, Hsinchu County (TW); Chun-Hung Chu, Hsinchu (TW); Chung-Chin Hsiao, Hsinchu County (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/879,949

(22) Filed: May 21, 2020

(65) Prior Publication Data

US 2020/0371640 A1    Nov. 26, 2020

(30) Foreign Application Priority Data

May 22, 2019   (CN) .......................... 201910430058.2

(51) Int. Cl.
*G06F 3/041*     (2006.01)
*G06F 3/044*     (2006.01)
*C23F 1/02*      (2006.01)

(52) U.S. Cl.
CPC .............. *G06F 3/0443* (2019.05); *C23F 1/02* (2013.01); *G06F 2203/04103* (2013.01)

(58) Field of Classification Search
CPC ................... G06F 3/0443; G06F 3/047; G06F 2203/04112; G06F 2203/04103
See application file for complete search history.

(56) References Cited

U.S. PATENT DOCUMENTS

2016/0246415 A1*  8/2016  Bae ....................... G06F 3/0445
2019/0179468 A1*  6/2019  Chen ..................... G06F 3/0412
2019/0227647 A1*  7/2019  Fang ....................... G06F 3/041

FOREIGN PATENT DOCUMENTS

| CN | 108932073 A | 12/2018 |
| TW | 201523378 A | 6/2015 |
| TW | M573017 U | 1/2019 |
| TW | M573018 U | 1/2019 |

* cited by examiner

*Primary Examiner* — Md Saiful A Siddiqui
(74) *Attorney, Agent, or Firm* — Cooper Legal Group, LLC

(57) ABSTRACT

A method of manufacturing a touch panel including providing a substrate having a display area and a peripheral area is provided. A metal layer and a metal nanowire layer are disposed, wherein a first portion of the metal nanowire layer is disposed in the display area, and a second portion of the metal nanowire layer and the metal layer are disposed in the peripheral area. A patterned layer with a pattern is disposed. A patterning step is performed according to the patterned layer, wherein the patterning step includes forming the metal layer into multiple peripheral wires and simultaneously forming the second portion of the metal nanowire layer into multiple etching layers by using an etching solution configured to etch the metal layer and the metal nanowire layer. A touch panel is further provided.

14 Claims, 20 Drawing Sheets

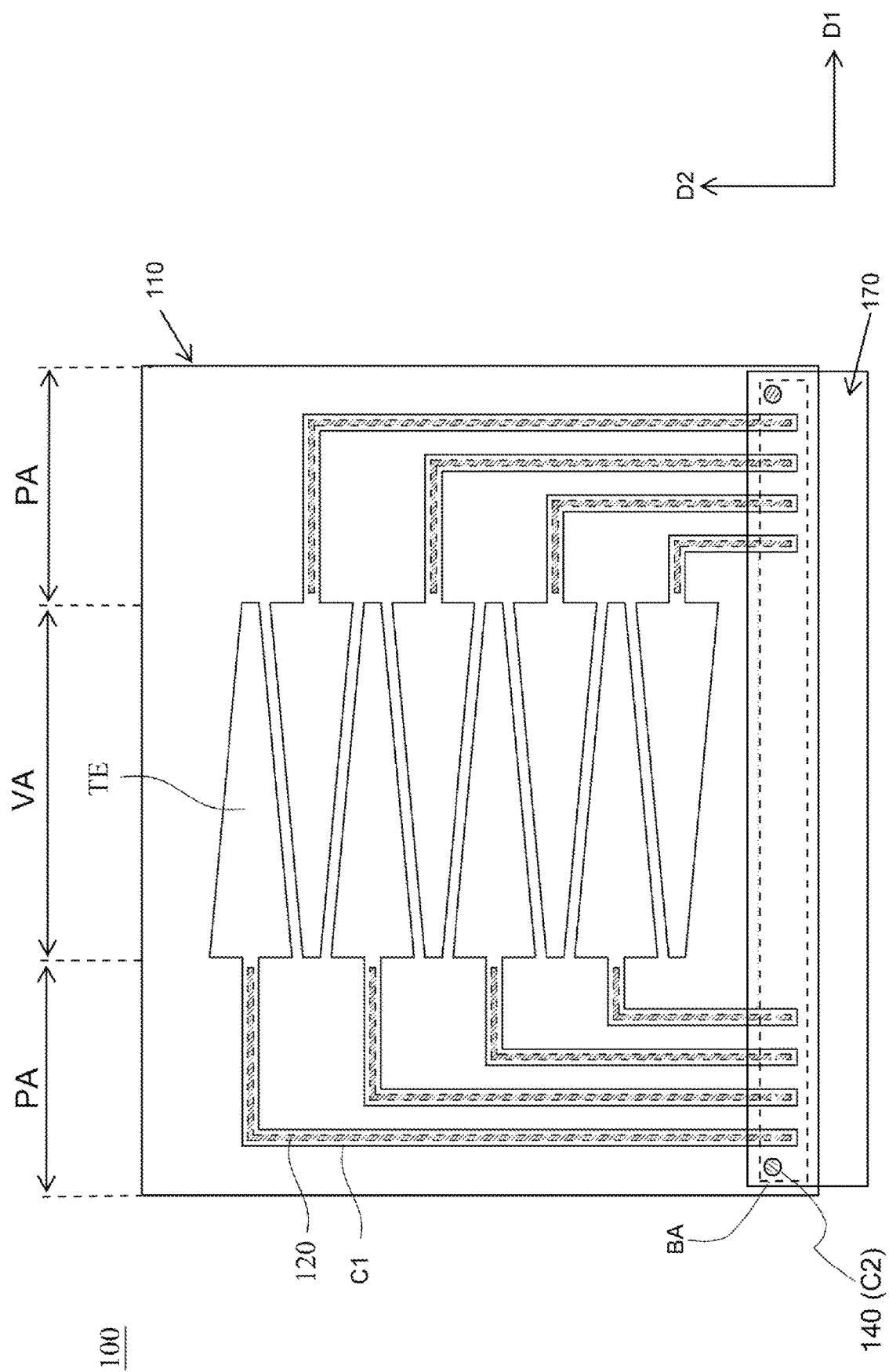

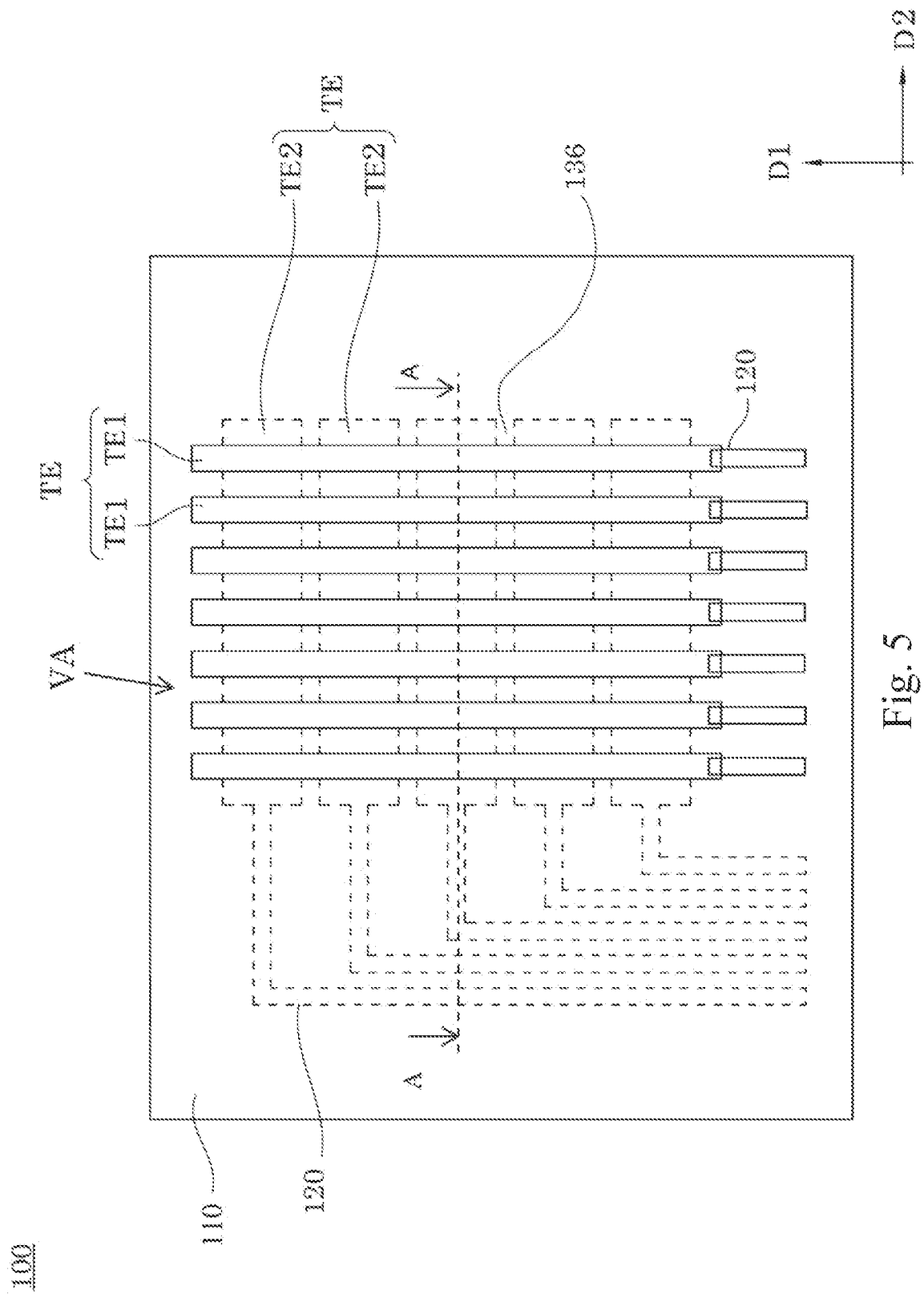

TOUCH PANEL AND MANUFACTURING METHOD THEREOF

CROSS-REFERENCE TO RELATED APPLICATION

This application claims priority to China Application Serial Number 201910430058.2, filed May 22, 2019, which is herein incorporated by reference in its entirety.

BACKGROUND

Field of Disclosure

The present disclosure relates to a touch panel and a manufacturing method thereof.

Description of Related Art

In recent years, transparent conductors have the characteristics of allowing light to pass through and simultaneously providing proper conductivity. Therefore, transparent conductors are often used in many display or touch-related devices. Generally, transparent conductors can be various metal oxides, for example, indium tin oxide (ITO), indium zinc oxide (IZO), cadmium tin oxide (CTO), or aluminum-doped zinc oxide (AZO). However, these metal oxide films cannot meet the flexibility requirements of display devices. Therefore, a variety of flexible transparent conductors have been developed, for example, transparent conductors made of materials of nanowires.

However, there are still many problems to be solved in the nanowire process technology. For example, most touch panel processes involve exposure development steps, and then undesired parts of the metal are removed according to the pattern. In the double-sided electrode manufacturing process, the interference problem of double-sided exposure must be overcome.

Further, in the process of manufacturing touch electrode by nanowires, an alignment bit error area needs to be reserved for nanowires and the wire of a peripheral area when performing an alignment. The wire size of the peripheral area caused by the alignment bit error area cannot be reduced, thereby causing the width of the peripheral area to become larger. Particularly, in the use of the roll-to-roll processing, the deformation of substrates causes the size of the alignment bit error area to be further enlarged (such as 150 µm) so that the minimum width of the peripheral area is only 2.5 mm. Therefore, it cannot meet the narrow bezel requirements of displays.

SUMMARY

In some embodiments of the present disclosure, by disposing of materials on the metal nanowire layer or metal layer in a patterned manner, the metal nanowire layer or metal layer can be directly patterned without additional exposure development steps. In this way, it achieves the purpose of simplifying the process, and further controlling the production cost.

In some embodiments of the present disclosure, by a one-step etching of a metal nanowire layer and a metal layer, the need for the alignment bit error area is removed. Therefore, a peripheral wire with a smaller width is formed, which further meets the requirements of a narrow frame.

According to some embodiments of the present disclosure, a touch panel is provided. The touch panel includes a substrate having a display area and a peripheral area, multiple peripheral wires disposed in the peripheral area, multiple first coverings covering the multiple peripheral wires, and a touch sensing electrode disposed in the display area. The touch sensing electrode is electrically connected to the multiple peripheral wires, and the multiple first coverings and the touch sensing electrode include metal nanowires. The touch panel also includes a patterned layer disposed on the multiple first coverings and the touch sensing electrode, wherein the patterned layer has printing sides.

In some embodiments of the present disclosure, a first composite structure is defined by the patterned layer and the multiple first coverings, or a second composite structure is defined by the patterned layer and the touch sensing electrode.

In some embodiments of the present disclosure, the multiple first coverings have sides. The sides of the multiple first coverings and sides of the multiple peripheral wires define common etching surfaces, and the common etching surfaces and the printing sides are aligned with each other.

In some embodiments of the present disclosure, the touch panel further includes multiple marks disposed in the peripheral area and multiple second coverings covering the multiple marks, wherein the multiple second coverings include metal nanowires.

In some embodiments of the present disclosure, the multiple second coverings have sides. The sides of the multiple second coverings and sides of the multiple marks define common etching surfaces, and the common etching surfaces and the printing sides are aligned with each other.

In some embodiments of the present disclosure, the touch panel further includes a film layer.

In some embodiments of the present disclosure, the multiple peripheral wires and the multiple marks are made of metal materials.

According to some embodiments of the present disclosure, a manufacturing method of a touch panel is provided. The manufacturing method includes providing a substrate having a display area and a peripheral area and disposing a metal layer and a metal nanowire layer. A first portion of the metal nanowire layer is disposed in the display area, and a second portion of the metal nanowire layer and the metal layer are disposed in the peripheral area. The manufacturing method also includes disposing a patterned layer having a pattern and performing a patterning step according to the patterned layer. The patterning step includes forming the metal layer into multiple peripheral wires and simultaneously forming the second portion of the metal nanowire layer into multiple etching layers by using an etching solution configured to etch the metal layer and the metal nanowire layer.

In some embodiments of the present disclosure, the patterning step further includes forming the first portion of the metal nanowire layer into a touch sensing electrode by using the etching solution. The touch sensing electrode is disposed in the display area, and the touch sensing electrode is electrically connected to the multiple peripheral wires.

In some embodiments of the present disclosure, disposing the patterned layer with the pattern includes forming the patterned layer by flexographic printing, letterpress printing, gravure printing or screen printing.

In some embodiments of the present disclosure, disposing the metal layer and the metal nanowire layer includes disposing the metal layer in the peripheral area; and subsequently disposing the metal nanowire layer in the display area and the peripheral area such that the first portion of the metal nanowire layer disposed in the display area is formed on the substrate and the second portion of the metal nanowire layer disposed in the peripheral area is formed on the metal layer.

In some embodiments of the present disclosure, disposing the metal layer in the peripheral area includes selectively forming the metal layer in the peripheral area without being formed in the display area.

In some embodiments of the present disclosure, disposing the metal layer in the peripheral area includes forming the metal layer in the peripheral area and the display area and removing the metal layer disposed in the display area.

In some embodiments of the present disclosure, disposing the patterned layer with the pattern includes disposing the patterned layer on the metal nanowire layer such that a composite structure is formed by the patterned layer and the metal nanowire layer.

In some embodiments of the present disclosure, the pattering step further includes forming the metal layer into multiple marks by using the etching solution. The multiple etching layers include multiple first coverings and multiple second coverings. Each of the multiple first coverings is disposed on a corresponding peripheral wire of the multiple peripheral wires, and each of the multiple second coverings is disposed on a corresponding mark of the multiple marks.

In some embodiments of the present disclosure, disposing the metal layer and the metal nanowire layer includes disposing the metal nanowire layer in the display area and the peripheral area and subsequently disposing the metal layer in the peripheral area, wherein the metal layer is on the second portion of the metal nanowire layer.

In some embodiments of the present disclosure, the patterning step further includes forming the metal layer into multiple marks on by using the etching solution. The multiple etching layers include multiple first interlayers and multiple second interlayers. Each of the multiple first interlayers is disposed between a corresponding peripheral wire of the multiple peripheral wires and the substrate, and each of the multiple second interlayers is disposed between a corresponding mark of the multiple mark and the substrate.

In some embodiments of the present disclosure, the manufacturing method further includes removing the patterned layer after the patterning step.

In some embodiments of the present disclosure, the manufacturing method further includes disposing a film layer.

In some embodiments of the present disclosure, the manufacturing method is performed on one side or on two opposite sides of the substrate.

BRIEF DESCRIPTION OF THE DRAWINGS

FIG. 1A to FIG. 10 are schematic views of steps of a manufacturing method for a touch panel according to some embodiments of the present disclosure.

FIG. 2 is a schematic top view of a touch panel according to some embodiments of the present disclosure.

FIG. 3 is a schematic top view of an assembled touch panel and a flexible printed circuit board according to some embodiments of the present disclosure.

FIG. 4 is a schematic view of a touch panel according to another embodiment of the present disclosure.

FIG. 5 is a schematic top view of a touch panel according to another embodiment of the present disclosure.

FIG. 7 is a schematic top view of a touch panel according to another embodiment of the present disclosure.

FIG. 8 is a schematic diagram of a touch panel according to another embodiment of the present disclosure.

FIG. 9 is a schematic top view of a touch panel according to another embodiment of the present disclosure.

FIG. 10 is a schematic top view of a touch panel according to another embodiment of the present disclosure.

DETAILED DESCRIPTION

Figure 1A:
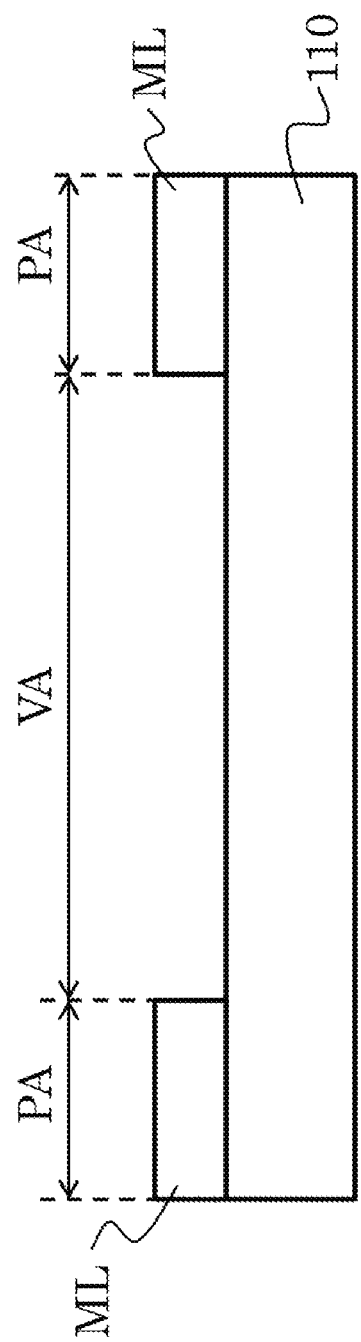

In the following, multiple embodiments of the present disclosure will be disclosed by drawings. Many practical details will be described in the following description for clarity. It should be understood, however, that these practical details should not be used to limit the disclosure. That is, in some embodiments of the present disclosure, these practical details are unnecessary. In addition, in order to simplify the drawings, some conventional structures and elements would be shown in the drawings in a simple and schematic manner.

Regarding "about", "around" or "approximately" as used herein, the error or range of the value is generally indicated within 20%, preferably within 10%, and more preferably within 5%. Unless explicitly stated in the text, the mentioned values are regarded as approximate values, that is, they have errors or ranges as indicated by "about", "around" or "approximately".

Figure 2:
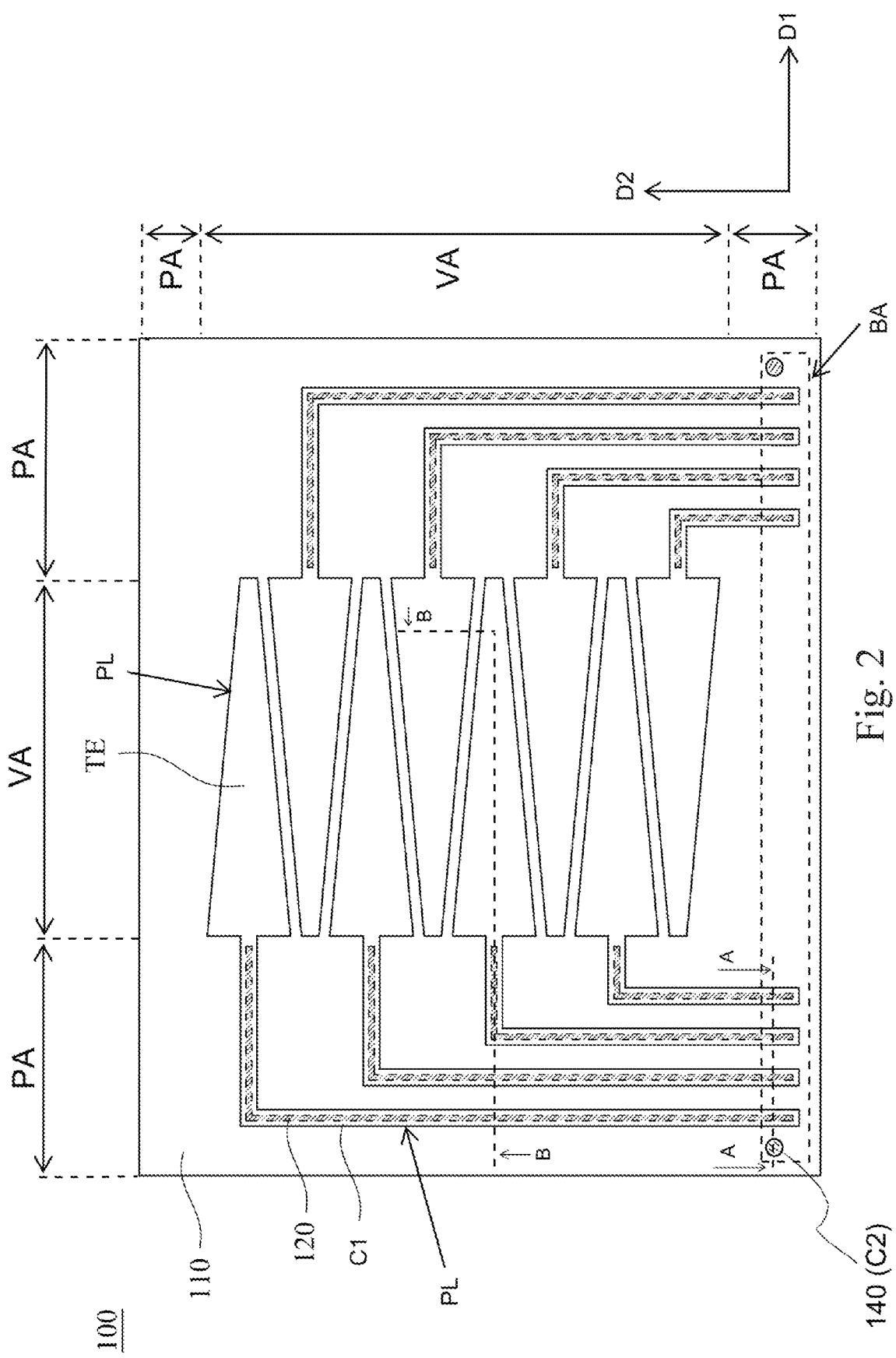
Figure 2A:
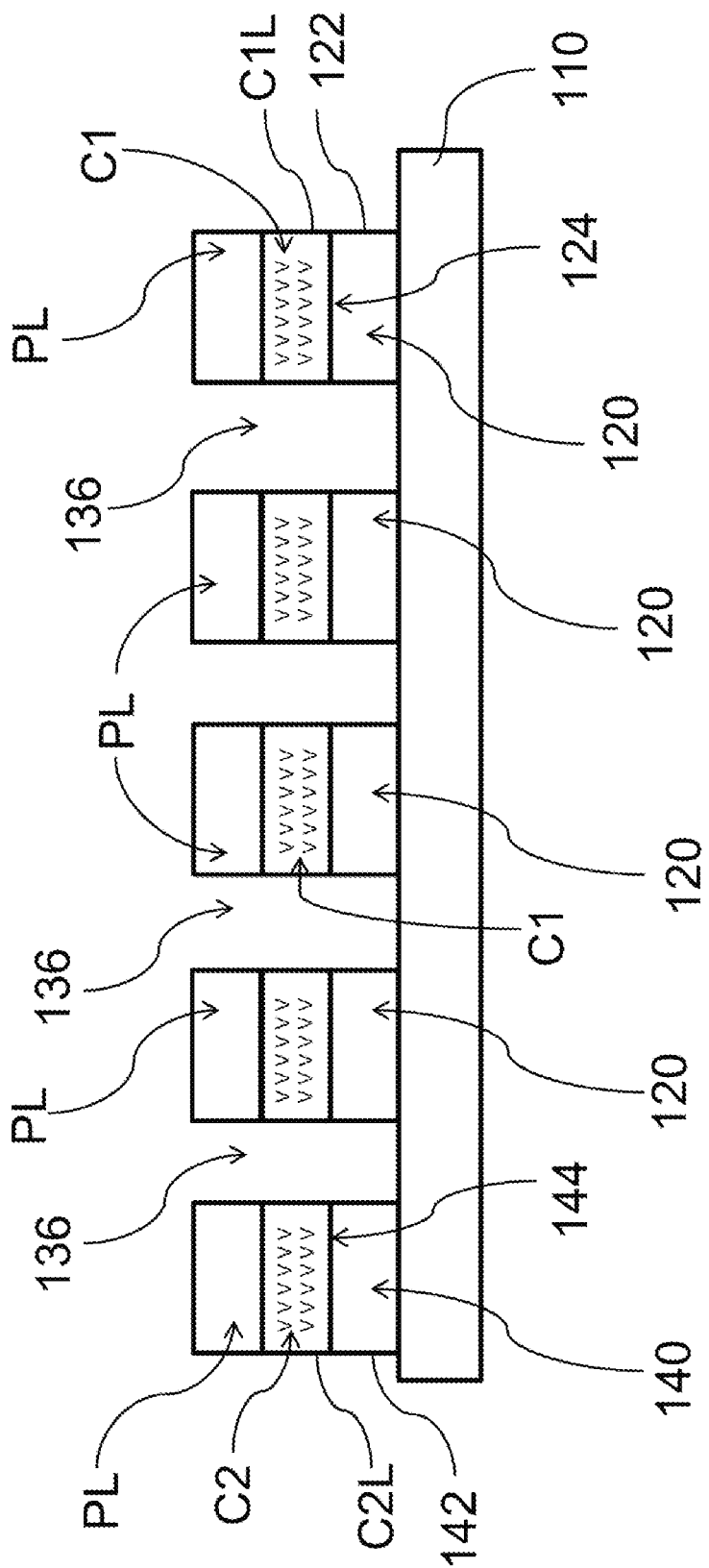
FIG. 2A is a schematic cross-sectional view taken along line A-A in FIG. 2.
Figure 2B:
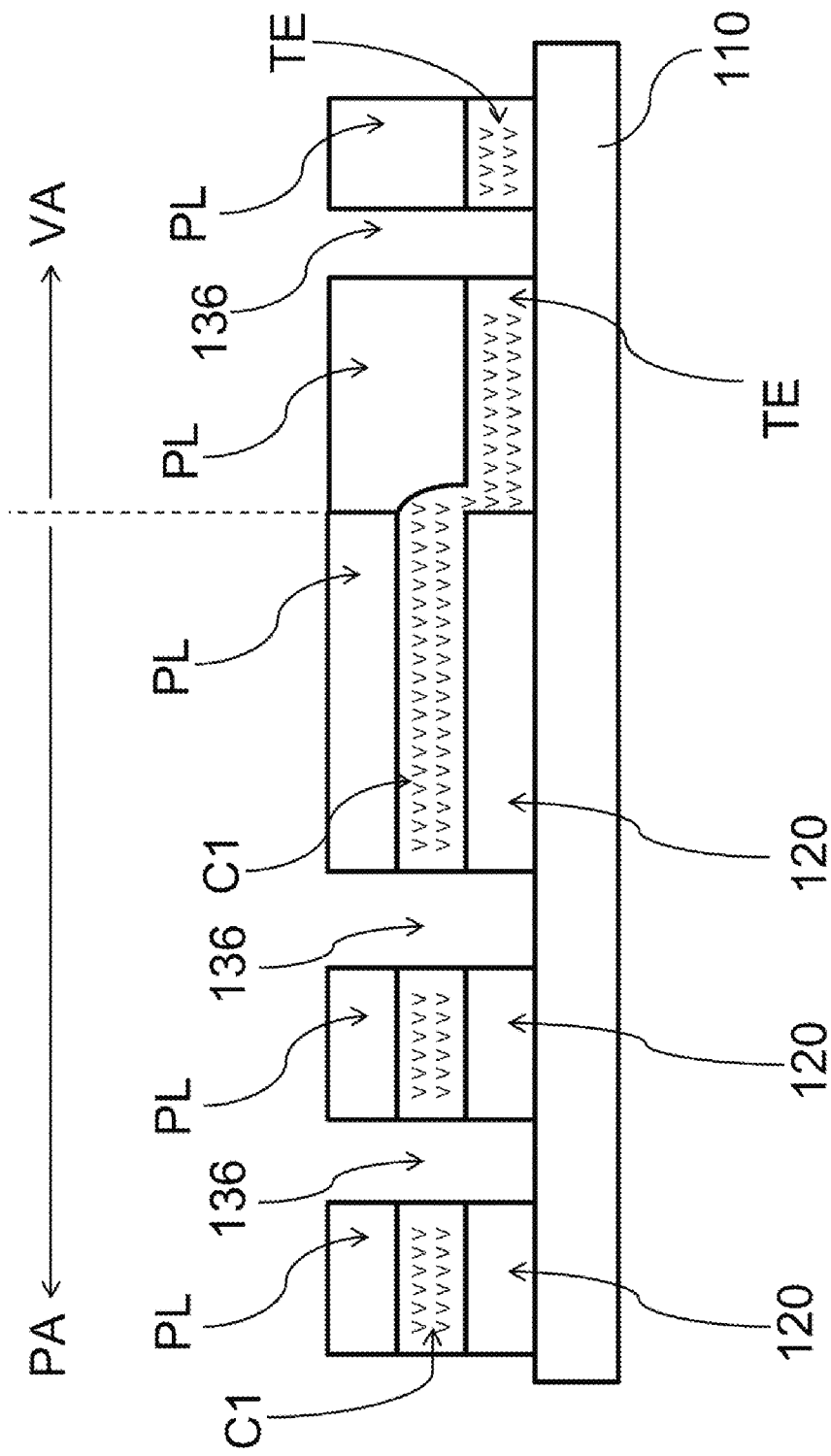
FIG. 2B is a schematic cross-sectional view taken along line B-B in FIG. 2.

Please refer to FIGS. 2 to 2B, which are a schematic top view and a schematic cross-sectional view of a touch panel 100 according to some embodiments of the present disclosure. The touch panel 100 includes a substrate 110, a peripheral wire 120, a first covering C1, a patterned layer PL, and a touch sensing electrode TE. Referring to FIG. 2, the substrate 110 has a display area VA and a peripheral area PA. The peripheral area PA is disposed on the side of the display area VA. For example, the peripheral area PA can be disposed on the frame-shaped area around the display area VA (that is, it covers the right, left, upper, and lower sides). But in other embodiments, the peripheral area PA may be an L-shaped area disposed on the left and lower sides of the display area VA. As shown in FIG. 2, in this embodiment, there are eight sets of peripheral wires 120 and first coverings C1. The eight sets of first coverings C1 corresponds to the peripheral wires 120. The peripheral wires 120 and first coverings C1 are disposed on the peripheral area PA of the substrate 110, and the touch sensing electrodes TE are generally disposed on the display area VA of the substrate 110.

A pattern can be performed by a patterned layer PL. The first coverings C1 can be disposed on the upper surfaces 124 of the peripheral wires 120, so that the upper and the lower layers of materials can be formed at the predetermined position without alignments. Thus, it can reduce or avoid the need to dispose the alignment bit error area in the process, so as to reduce the width of the peripheral area PA, thereby achieving the narrow bezel of the display.

The touch panel 100 further includes a mark 140 and a second covering C2. Referring to FIG. 2, this embodiment has two sets of marks 140 and second coverings C2 which are corresponding to the marks 140. The second coverings C2 are disposed in the peripheral area PA of the substrate 110. The number of the peripheral wire 120, mark 140, first covering C1, second covering C2, and touch sensing electrode TE described above may be one or more. The numbers drawn in the following specific embodiments and drawings are for illustration only and the disclosure is not limited.

Figure 1B:
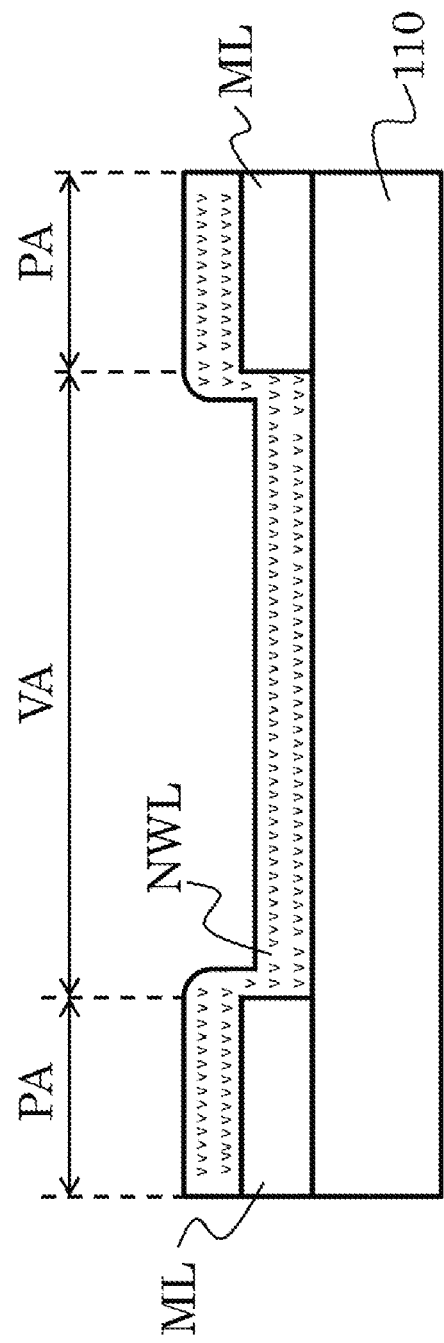
Figure 1C:
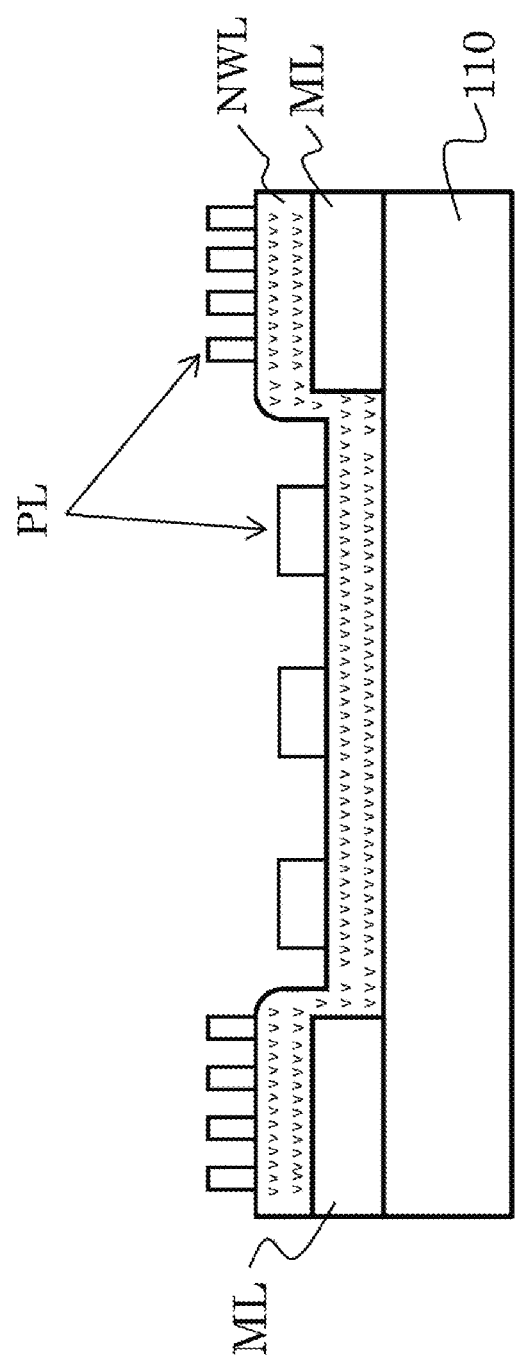

Specifically, referring to FIGS. 1A to 10, the touch panel 100 of the embodiment of the present disclosure can be manufactured in the following method. Firstly, a substrate 110 is provided, which has a peripheral area PA and a display area VA defined in advance. Next, a metal layer ML is formed in the peripheral area PA (as shown in FIG. 1A). A metal nanowire (metal nanowires) layer NWL is formed in the peripheral area PA and the display area VA (as shown in FIG. 1B). A patterned layer PL is then formed on the metal nanowire layer NWL (as shown in FIG. 10). Subsequently, patterning in accordance with the patterned layer PL is performed to form a metal layer ML and a metal nanowire layer NWL with the pattern. The following are more detailed descriptions.

Please refer to FIG. 1A. A metal layer ML is formed in the peripheral area PA of the substrate 110, and the metal layer ML can be subjected to subsequent patterning to become a peripheral wire 120. In detail, in some embodiments of the present disclosure, the metal layer ML may be made of metal with better conductivity, preferably a single-layer metal structure, such as a silver layer, a copper layer and so on, or a multi-layer conductive structure, such as molybdenum/aluminum/molybdenum, copper/nickel, titanium/aluminum/titanium, molybdenum/chromium and so on. The above metal structure is preferably opaque. For example, the transmission of the visible light (such as having a wavelength between 400 nm and 700 nm) is less than about 90%.

In the present embodiment, the foregoing metal may be formed on the substrate 110 by a sputtering method (such as, but not limited to, physical sputtering, chemical sputtering and so on). The metal layer ML can be selective directly formed in the peripheral area PA and rather than in the display area VA. Alternatively, the metal layer ML can be firstly formed in the entire area PA and the display area VA, and then the metal layer ML located in the display area VA is removed by steps, such as etching.

In one embodiment, a copper layer is disposed in the peripheral area PA of the substrate 110 by electroless plating. The electroless plating means that in the absence of an external current, with the help of a suitable reducing agent, the metal ions in the plating solution are reduced to metal by the metal catalyst and plated on the surface. This process is also known as chemical plating or autocatalytic plating. Therefore, the metal layer ML in this embodiment may also be used by electroless plating, chemical plating or autocatalytic plating. Specifically, for example, a plating solution containing copper sulfate as the main component may be used, and its composition may be, but is not limited to, copper sulfate at a concentration of 5 g/L, ethylenediaminetetraacetic acid at a concentration of 12 g/L, and formaldehyde at a concentration of 5 g/L. The pH of the electroless copper plating bath is adjusted to about 11 to 13 with sodium hydroxide, the bath temperature is about 50 to 70° C., and the reaction time for soaking is 1 to 5 minutes. In one embodiment, a catalytic layer (not shown) may be formed in the peripheral area PA of the substrate 110. Since there is no catalytic layer in the display area VA, the copper layer is deposited only in the peripheral area PA and is not formed in the display area VA. During the electroless plating reaction, the copper material can be nucleated on a catalytic layer, which has the ability to catalyze/activate, and then rely on the self-catalysis of copper to continue growing the copper film.

Next, please refer to FIG. 1B. A metal nanowire layer NWL including at least a metal nanowire is coated in the peripheral area PA and the display area VA. The metal nanowire layer NWL can be, for example, a silver nanowire layer, a gold nanowire layer, or a copper nanowire layer. The first portion of the metal nanowire layer NWL is in the display area VA. The first portion is mainly formed on the substrate 110, and the second portion of the metal nanowire layer NWL is mainly formed on the peripheral area PA. The specific method in the present embodiment is as follows. A dispersion or ink having metal nanowires on the substrate 110 is formed by a coating method. The metal nanowires are dried on the surface of the substrate 110 and the foregoing metal layer ML, thereby forming to the metal nanowire layer NWL which is disposed on the substrate 110 and the foregoing metal layer ML. After the above curing/drying step, solvents and other substances are volatilized. The metal nanowires are randomly distributed on the surface of the substrate 110 and the foregoing metal layer ML. Preferably, the metal nanowires are fixed on the surface of the substrate 110 and the foregoing metal layer ML, and the metal nanowire layer NWL is formed without falling off. Moreover, the metal nanowires can contact each other to provide a continuous current path, thereby forming a conductive network.

In the embodiment of the present disclosure, the foregoing dispersion liquid may be water, alcohol, ketone, ether, hydrocarbon, or aromatic solvent (benzene, toluene, xylene, and so on). The foregoing dispersion liquid may also contain additives, surfactants or adhesives, such as carboxymethyl cellulose (CMC), 2-hydroxyethyl cellulose (HEC), hydroxypropyl methylcellulose (HPMC), sulfonate, sulfate, disulfonate, sulfosuccinate, phosphate ester, fluorosurfactant, and so on. The dispersion or ink containing the metal nanowires can be formed on the surface of the substrate 110 and the metal layer ML in any manner, such as, but not limited to, screen printing, nozzle coating, roller coating and other processes. In one embodiment, a roll-to-roll (RTR) process can be used to coat the continuously supplied substrate 110 and the surface of the foregoing metal layer ML by the dispersion or ink containing metal nanowires.

As used herein, "metal nanowires", is a collective term. The metal nanowires refer to a collection of metal wires containing multiple elemental metals, metal alloys or metal compounds (including metal oxides), wherein the number of metal nanowires does not affect the claimed scope of the present disclosure. At least one cross-sectional dimension (that is, the diameter of the cross-section) of the single metal nanowire is less than about 500 nm, preferably less than about 100 nm, and more preferably less than about 50 nm. The metal nanostructure referred to in the present disclosure as a "wire" has a high aspect ratio, for example, between about 10 and 100,000. In more detail, the aspect ratio (length/diameter of the cross-section) of metal nanowires may be greater than about 10, preferably greater than about 50, and more preferably greater than about 100. The metal nanowires may be any metal, including (but not limited to) silver, gold, copper, nickel, and gold-plated silver. Other terms, such as silk, fiber, tube and so on, are also covered by the present disclosure if that also has the foregoing size and high aspect ratio.

Next, please refer to FIG. 10. A patterned layer PL is formed on the metal nanowire layer NWL. In one embodiment, the patterned layer PL is formed on the metal nanowire layer NWL in a patterned structure directly by using flexography technology. In other words, the patterned layer PL is formed on the working surface (in this embodiment, that is the metal nanowire layer NWL) and has a specific pattern at the same time, so there is no need to perform a patterning step for the coated material. According to one or more specific examples of the present disclosure, the foregoing patterned layer PL can be produced by using a flexography method, such as, but not limited to, the following printing device. The equipment of the flexography may include at least a feeding roller and a printing roller, which has a flexography structure. In operation, the feeding roller is rotated to transfer materials to be printed from the feeding tray to the feeding roller. Then, as the feeding roller is rotated, the printed material is transferred to the flexography structure. The flexography structure may include a contact surface with a specific pattern, and according to the specific pattern, transfer the printed material onto the metal nanowire layer NWL. In one embodiment, after the printed material is printed on the metal nanowire layer NWL, a curing step may be performed according to the material characteristics. In one embodiment, the patterned layer PL transfers the printing material onto the metal nanowire layer NWL according to the specific pattern by using letterpress printing, gravure printing, screen printing, and so on. The patterned layer PL produced according to the foregoing method may have a printed side. The foregoing method is different from the conventional process, such as exposure development or etching.

The patterned layer PL may be formed in the peripheral area PA according to the foregoing method, and may also be formed in the peripheral area PA and the display area VA. The patterned layer PL located in the peripheral area PA (also known as the second patterned layer) is mainly used as an etching mask for the peripheral area PA. It is used for patterning the metal nanowire layer NWL and metal layer ML of the peripheral area PA in the steps described below. The patterned layer PL located in the display area VA (also referred to as the first patterned layer) is mainly used as an etching mask for the display area VA. It is used for patterning the metal nanowire layer NWL of the display area VA in the steps described below.

The embodiments of the present disclosure do not limit the material of the patterned layer PL (that is, the foregoing printed material). For example, polymer materials include the following: various photoresist materials, undercoat materials, outer coating materials, protective layer materials, insulating layers, and so on. The polymer materials may be a phenolic resin, epoxy resin, acrylic resin, PU resin, ABS resin, amino resin, silicone resin, and so on. In terms of material characteristics, the material of the patterned layer PL can be a photo-curing type or a thermo-curing type. In one embodiment, the material of patterned layer PL has the viscosity of about 200-1500 cps and the solid content of about 30-100%.

Subsequently, a patterning is performed. After the patterning step, a touch panel 100 as shown in FIG. 2 can be manufactured. In one embodiment, an etching solution, which can simultaneously etch metal nanowire layer NWL and metal layer ML, is used in the peripheral area PA. The etching mask formed by the patterned layer PL (also referred to as the second patterned layer) is used to produce the patterned metal layer ML and the patterned metal nanowire layer NWL in the same process. As shown in FIG. 2 and FIG. 2B, the patterned metal layer ML produced in the peripheral area PA is peripheral wires 120, and the patterned metal nanowire layer NWL constitutes an etching layer. Since the etching layer is located on the peripheral wires 120, it can also be called the first coverings C1. In other words, after the patterning step, in the peripheral area PA, the first coverings C1 composed of the second portion of the metal nanowire layer NWL and the peripheral wires 120 composed of the metal layer ML are formed. In another embodiment, an etching layer composed of the second portion of the metal nanowire layer NWL and peripheral wires 120 composed of the metal layer ML and marks 140 can be manufactured in the peripheral area PA (refer to FIGS. 2, 2A and 2B). The etching layer may include a first covering C1 and a second covering C2. The first covering C1 is disposed on the corresponding peripheral wire 120, and the second covering C2 is disposed on the corresponding mark 140. In one embodiment, the metal nanowire layer NWL and the metal layer ML can be etched at the same time, which means that the ratio of the metal nanowire layer NWL to the metal layer ML is about 0.1-10 or 0.01-100.

According to one specific embodiment, when the metal nanowire layer NWL is a silver nanowire layer and the metal layer ML is a copper layer, the etching solution can be used to etch copper and silver. For example, the main component of the etching solution is $H_3PO_4$ (the proportion is about 55% to 70%) and $HNO_3$ (the proportion is about 5% to 15%) to remove copper and silver materials in the same process. In another specific embodiment, besides the main component of the etching solution, additives may be added, such as an etching selectivity adjuster, to adjust the rate of etching copper and silver. For example, about 5% to 10% of benzotriazole (BTA) is added to the main component of $H_3PO_4$ (the proportion is about 55% to 70%) and $HNO_3$ (the proportion is about 5% to 15%) to solve the problem of copper over-etching. In another specific embodiment, the main component of the etching solution is ferric chloride/nitric acid or phosphoric acid/hydrogen peroxide, and so on.

The patterning step further includes simultaneously performing a patterning of the metal nanowire layer NWL in the display area VA. In other words, as shown in FIG. 10, the etching mask is formed in accordance with the patterned layer PL (also referred to as the first patterned layer), and the first portion of the metal nanowire layer NWL in the display area VA is patterned by using the foregoing etching solution to make touch sensing electrodes TE of this embodiment in the display area VA. The touch sensing electrodes TE can be electrically connected to the peripheral wires 120. More specifically, the touch sensing electrodes TE may also be the metal nanowire layer including at least metal nanowires. That is to say, the patterned metal nanowire layer NWL forms the touch sensing electrodes TE in the display area VA and forms the first coverings C1 in the peripheral area PA. Therefore, the touch sensing electrodes TE can achieve electrical connection with the peripheral wires 120 for signal transmission by contacting the first coverings C1 with the peripheral wires 120. The metal nanowire layer NWL would also form a second covering C2 in the peripheral area PA. The second covering C2 is disposed on the upper surfaces 144 of marks 140. Marks 140 can be widely interpreted as a pattern of non-electrical functions, but it is not limited to thereof. In some embodiments of the present disclosure, the peripheral wires 120 and marks 140 may be made of the same layer of the metal layer ML (that is, both the peripheral wires 120 and marks 140 are the same metal material, such as the foregoing electroless copper plating layer or sputtered copper layer). The touch sensing electrodes TE, first coverings C1 and second coverings C2 can be made of metal nanowire layer NWL, and are therefore made from the same layer.

In a variant embodiment, the metal nanowire layer NWL located in the display area VA and the peripheral area PA can be patterned by different etching steps (that is, different etching solutions are used). For example, the metal nanowire layer NWL is a silver nanowire layer. In the case of the metal layer ML being a copper layer, the etching solution used for the display area VA may be selected to be an etching solution only capable of etching silver. In other words, the etching rate of the etching solution for silver is greater than about 100 times, about 1000 times, or about 10,000 times the etching rate for copper.

According to a specific embodiment, the patterned layer PL is selected from materials that can remain in the structure. In other words, the patterned layer PL is not removed after the foregoing etching steps. For example, the patterned layer PL can be an ultraviolet curable (UV-curable) material having the characteristics of high transmittance, low dielectric constant, and low haze, to maintain the transmittance of the touch sensing electrodes TE in the display area VA between about 88% to 94%, the haze between about 0 to 2, and the surface resistance between about 10 to 150 ohm/square. The optoelectronic property of the foregoing patterned layer PL makes the combination of the patterned layer PL and the metal nanowire layer NWL meet the requirements of optics and touch sensors in the display area VA. In the present embodiment, the method further includes a curing step (such as ultraviolet (UV) curing). After curing, a composite structure formed by the touch sensing electrodes TE in the display area VA and the patterned layer PL may be used, and the composite structure preferably has conductivity and transmission. For example, the composite structure may have a transmission greater than about 80% for visible light (such as having a wavelength between about 400 nm and 700 nm) and a surface resistance between about 10 and 1000 ohm/square; preferably, the transmission is greater than about 85% for visible light (such as having a wavelength between about 400 nm and 700 nm), and the surface resistance is about 50 to 500 ohm/square.

In addition, the foregoing patterned layer PL can form a composite structure with the metal nanowire layer NWL (such as the first coverings C1, the second coverings C2 or the touch sensing electrode TE) and have certain specific chemical, mechanical and optical properties. For example, the composite structure provides adhesion of the touch sensing electrodes TE, first coverings C1, second coverings C2, and substrate 110, or better physical-mechanical strength, so the patterned layer PL can also be referred to as a matrix. On the other hand, the patterned layer PL is made of some specific polymers, so that the touch sensing electrodes TE, first coverings C1, and second coverings C2 have additional surface protection having scratch resistance and abrasion resistance. In this case, the patterned layer PL can also be referred to as an overcoat. The touch sensing electrodes TE, first coverings C1, and second coverings C2 can have higher surface strength to improve the ability of scratch resistance, by using, for example, polyacrylate, epoxy resin, polyurethane, polysilane, polysiloxane, poly (silicone-acrylic) and so on. However, the above mention is only to explain the possibility of other additional functions/names of the patterned layer PL and is not intended to limit the present disclosure. It is worth noting that the drawings herein illustrate the patterned layer PL and the touch sensing electrodes TE, first coverings C1, and second coverings C2 as different layer structures. However, in one embodiment, the polymer used to make the patterned layer PL can infiltrate into among the metal nanowires to form a filler before being cured or in a pre-cured state. When the polymer is cured, the metal nanowires will be embedded in the patterned layer PL. That is to say, the present disclosure does not limit the structure between the patterned layer PL and the metal nanowire layer NWL (such as the first coverings C1, the second coverings C2, or the touch sensing electrodes TE).

FIG. 2 is a schematic top view of a touch panel 100 according to an embodiment of the present disclosure. FIGS. 2A and 2B are cross-sectional views taken along lines A-A and B-B, respectively. Please refer to FIG. 2A first. As shown in FIG. 2A, the peripheral wires 120 and mark 140 are both disposed in the peripheral area PA. The first coverings C1 and the second covering C2 are respectively formed and cover the upper surfaces 124 of the peripheral wires 120 and the upper surface 144 of the mark 140. The patterned layer PL is retained on the first coverings C1 and the second covering C2 after the foregoing etching process. In some embodiments of the present disclosure, the metal nanowires may be silver nanowires. For the convenience of explanation, the cross-section of the peripheral wires 120 and the mark 140 in the present disclosure is a quadrangle (such as the rectangle drawn in FIG. 2A), but the structural types or quantities of the sides 122 and upper surfaces 124 of peripheral wires 120, and the side 142 and upper surface 144 of mark 140 can all be changed according to the actual application, and it is not limited by the text and drawings of the present disclosure.

In this embodiment, the mark 140 is disposed in a bonding area BA in the peripheral area PA. The bonding area BA is the marks of alignment bits. In other words, a step of connecting an external circuit board, such as a flexible printed circuit board 170 to the touch panel 100 (that is, the bonding step), used for aligning the marks of the flexible printed circuit board 170 and the touch panel 100 (please refer to FIG. 2). However, the present disclosure does not limit the placement position or function of the mark 140. For example, the mark 140 may be any inspection mark, pattern or label required in the process. They are all within the protection scope of the present disclosure. The mark 140 can have any possible shape, such as circle, quadrilateral, cross, L-shaped, T-shaped, and so on. On the other hand, the portion of the peripheral wires 120 extending to the bonding area BA can also be referred to as a bonding section. Similar to the foregoing embodiment, the upper surface of the bonding portion of the bonding area BA is also covered by the first coverings C1.

As shown in FIG. 2A and FIG. 2B, in the peripheral area PA, non-conductive areas 136 are provided between adjacent peripheral wires 120 to electrically block adjacent peripheral wires 120 to avoid a short circuit. That is, there are non-conductive areas 136 between the sides 122 of adjacent peripheral wires 120. In this embodiment, the non-conductive areas 136 are gaps to isolate the adjacent peripheral wires 120. With the patterned layer PL, the foregoing gaps can be made by an etching method, so the sides 122 of the peripheral wires 120 and sides C1L of the first coverings C1 are common etching surfaces and are aligned with each other. In other words, the printed sides of the patterned layer PL are used as a reference. The sides 122 of the peripheral wires 120 and the sides C1L of the first coverings C1 are formed in the same etching step according to the printed sides of the patterned layer PL. Therefore, the printed sides and the common etching surfaces are aligned with each other. Similarly, the sides 142 of the mark 140 and sides C2L of the second covering C2 are common etching surfaces and are aligned with each other, and the printed sides of the patterned layer PL are also aligned with the common etching surfaces. In one embodiment, the sides C1L of the first coverings C1 and the sides C2L of the second covering C2 would not have the metal nanowires thereon because of the foregoing etching step. Further, the patterned layer PL, peripheral wires 120 and first coverings C1 would have the same or similar patterns and sizes. For example, they are all long and straight patterns, and the widths are the same or similar. The patterned layer PL, mark 140, and second coverings C2 also have the same or similar patterns and sizes. For example, they are all circles with the same or similar radius, quadrilaterals with the same or similar sides, or other identical or similar crosses, L-shaped, T-shaped, and so on.

As shown in FIG. 2B, in the display area VA, non-conductive areas 136 are between adjacent touch sensing electrodes TE to electrically block the adjacent touch sensing electrodes TE to avoid a short circuit. That is, there are non-conductive areas 136 between the sidewalls of the adjacent touch sensing electrodes TE. In the present embodiment, the non-conductive areas 136 are gaps to isolate the adjacent touch sensing electrodes TE. In one embodiment, the foregoing etching method can be used to make gaps between adjacent touch sensing electrodes TE, so the printed sides of the patterned layer PL and the etching sides of the touch sensing electrodes TE are aligned with each other so as to be coplanar. In the present embodiment, the touch sensing electrodes TE and the first coverings C1 can be made by using the same metal nanowire layer NWL (such as a silver nanowire layer). Therefore, at the junction of the display area VA and the peripheral area PA, the metal nanowire layer NWL would form a climbing structure (i.e., a stair-step structure) to beneficially form the touch sensing electrodes TE and the first coverings C1, which cover the upper surfaces 124 of the peripheral wires 120.

In some embodiments of the present disclosure, the first coverings C1 of the touch panel 100 are disposed on the upper surfaces 124 of the peripheral wires 120. The first coverings C1 and the peripheral wires 120 are formed in the same etching process, so it is possible to reduce or avoid the requirement of setting alignment bit error area in the process. In this way, the width of the peripheral area PA is reduced and the requirements of the narrow bezel of the display are met. Specifically, in some embodiments of the present disclosure, the width of the peripheral wires 120 of the touch panel 100 is about 5 μm to 30 μm, and the distance between adjacent peripheral wires 120 is about 5 μm to 30 μm. Alternatively, the width of the peripheral wires 120 of the touch panel 100 is about 3 μm to 20 μm, and the distance between adjacent peripheral wires 120 is about 3 μm to 20 μm. The width of the peripheral area PA can also reach a size of less than about 2 μm, which reduces the frame size by about 20% or more compared to traditional touch panel products.

In some embodiments of the present disclosure, the touch panel 100 further includes second coverings C2 and marks 140. The second coverings C2 are disposed on the upper surfaces 144 of the marks 140, and the second coverings C2 and the marks 140 are formed in the same etching process.

FIG. 3 shows the assembly structure of the flexible printed circuit board 170 after being aligned with the touch panel 100. The electrode pads (not shown) of the flexible printed circuit board 170 can be electrically connected to the peripheral wires 120 of the bonding area BA on the substrate 110 through conductive adhesives (not shown, such as anisotropic conductive adhesive). In some embodiments, the first coverings C1 located in the bonding area BA can set up openings (not shown), and the peripheral wires 120 are exposed. Conductive adhesives (such as anisotropic conductive adhesive) can be filled into the openings of the first coverings C1, and the conductive adhesives directly contact the peripheral wires 120 to form conductive paths. In the present embodiment, the touch sensing electrodes TE are arranged in a non-interlaced arrangement. For example, the touch sensing electrodes TE are longitudinal electrodes extending along in the first direction D1 and having variable width in the second direction D2, and do not interlace with each other. However, in other embodiments, the touch sensing electrodes TE may have appropriate shapes, and the scope of the present disclosure should not be limited by this. In the embodiment, the touch sensing electrodes TE are in single-layer configuration, wherein the touch position can be obtained by detecting the change in capacitance value of each touch sensing electrode TE. Moreover, the patterned layer PL and the touch sensing electrodes TE have the same or similar patterns and sizes, such as the foregoing patterns of longitudinal electrodes extending along the first direction D1 and having variable width in the second direction D2, and the sizes are the same or similar.

Figure 4:
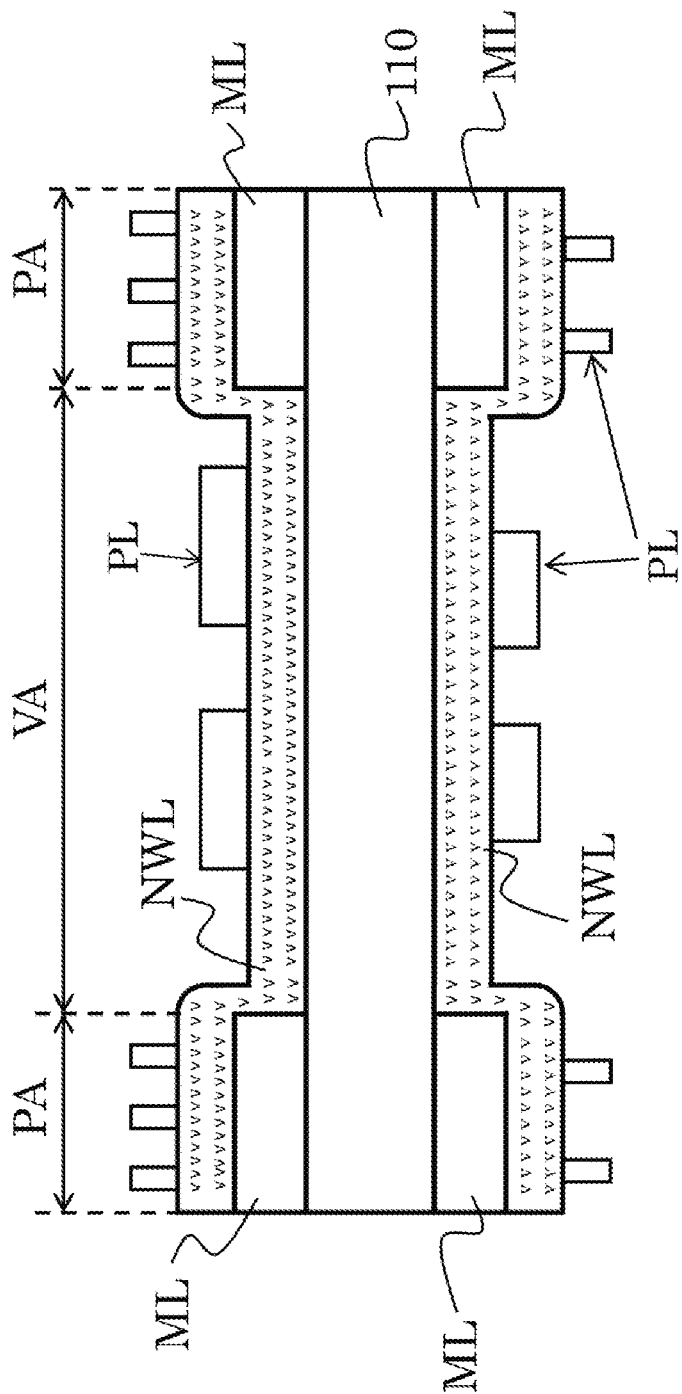

The present disclosure can also apply the foregoing method to the double-sided touch panel 100 of the substrate 110. For example, the double-sided touch panel 100 can be produced in the following manner. Firstly, the substrate 110 is provided, which has a peripheral area PA and a display area VA defined in advance. Next, metal layers ML are formed on the corresponding first and second surfaces of the substrate 110 (such as the upper surface and the lower surface), and the metal layer ML is located in the peripheral area PA. Then, metal nanowire layers NWL are formed on the peripheral area PA and the display area VA of the first and the second surfaces, respectively. Then, the patterning step of the first and the second surfaces is performed according to the patterned layer PL to form the foregoing touch sensing electrodes TE and the peripheral wires 120 on the first and the second surfaces, and the first coverings C1 cover the peripheral wires 120. A flexography process can be used in the method of forming the patterned layer PL in this step. In this step, the flexography process can be used to dispose the patterned layer PL on the metal nanowire layers NWL on the first and the second surfaces, respectively, as shown in FIG. 4. Since the present embodiment does not need to go through a photolithography process (exposure development and so on), there is no problem of mutual influence/interference of the double-sided process, which is beneficial to simplify the process and improve the yield. Other details of the embodiment are generally as described in the above embodiment and are not repeated herein.

Figure 5A:
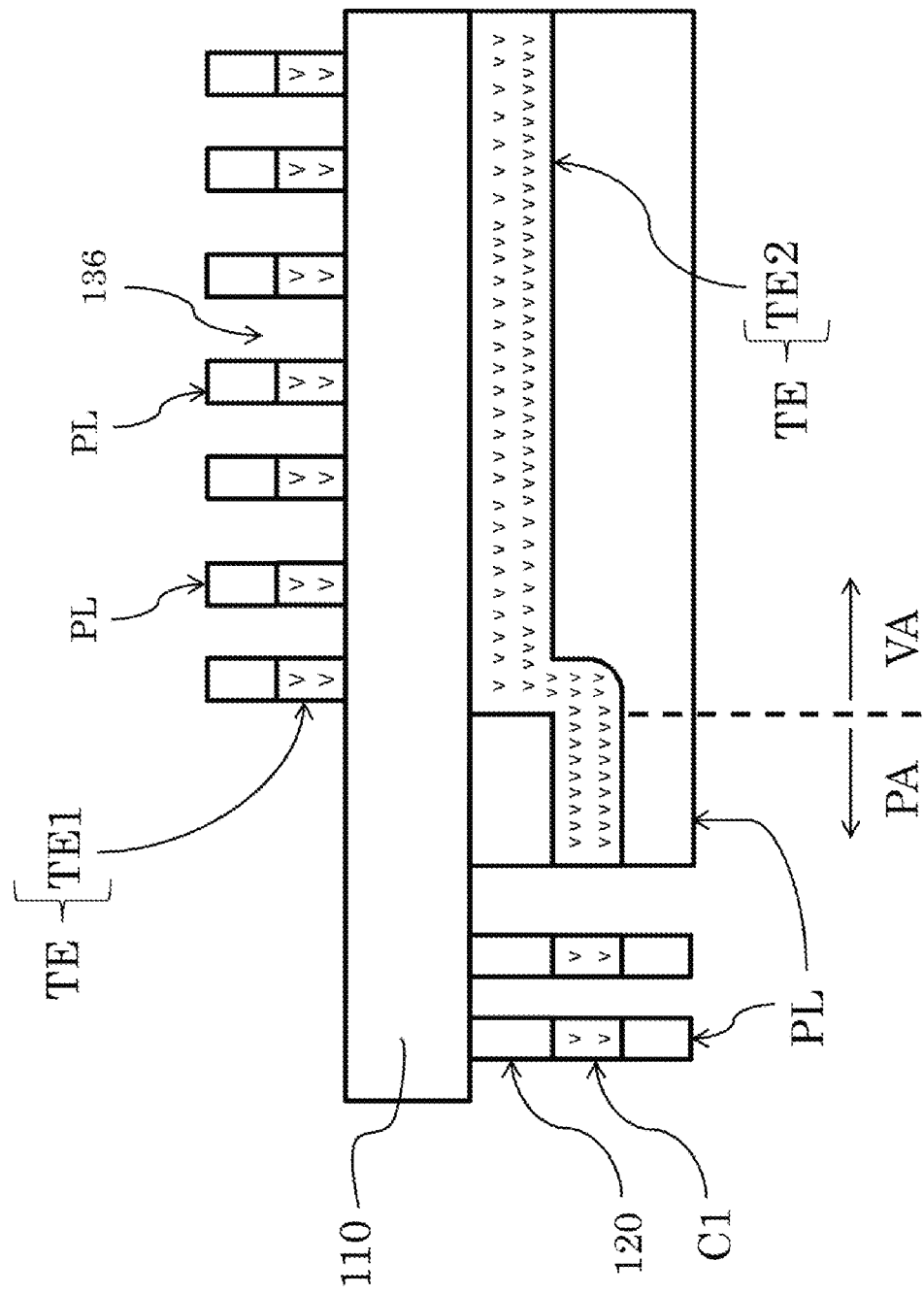
FIG. 5A is a schematic cross-sectional view taken along line A-A of FIG. 5.

The touch panel 100 in FIG. 5 is an embodiment of the present disclosure. The touch panel 100 includes a substrate 110, touch sensing electrodes TE formed on the upper and the lower surfaces of the substrate 110 (that is the first touch sensing electrodes TE1 and second touch sensing electrodes TE2 formed by the metal nanowire layer NWL) and the peripheral wires 120 formed on the upper and the lower surfaces of the substrate 110. For simplicity of the drawings, the first coverings C1, second coverings C2, and patterned layer PL are not shown in FIG. 5. In a view showing the upper surface of the substrate 110, the first touch sensing electrodes TE1 in the display area VA and the peripheral wires 120 in the peripheral area PA are electrically connected to each other to transmit signals. Similarly, in a view showing the lower surface of the substrate 110, the second touch sensing electrodes TE2 in the display area VA and the peripheral wires 120 in the peripheral area PA are electrically connected to each other to transmit signals. In addition, as in the foregoing embodiment, the first touch sensing electrodes TE1 and the second touch sensing electrodes TE2 are respectively formed with patterned layer PL (as shown in FIG. 5A). The peripheral wires 120 are composed of a metal layer ML, and the first coverings C1 and patterned layer PL are formed on the peripheral wires 120 (also as shown in FIG. 5A). The present embodiment may further include the marks 140 and the second coverings C2 corresponding to the marks 140. The second coverings C2 are disposed in the peripheral area PA of the substrate 110. For details, refer to the foregoing content.

Please refer to FIG. 5 and the cross-sectional view shown in FIG. 5A. In one embodiment, the first touch sensing electrodes TE1 are roughly located in the display area VA. The first touch sensing electrodes TE1 may include a plurality of long-and-straight shaped sensing electrodes extending in the same direction (such as a first direction D1). The etch-removed area can be defined as non-conductive areas 136 to block adjacent sensing electrodes electrically. Each sensing electrode has a patterned layer PL, and each first touch sensing electrode TE1 and each patterned layer PL have corresponding patterns. In one embodiment, the first touch sensing electrodes TE1 and the patterned layer PL have substantially the same pattern, the long-and-straight shape as described above, and the first touch sensing electrodes TE1 and the patterned layer PL have mutually aligned side edges or sides. Similarly, the second touch sensing electrodes TE2 are roughly located in the display area VA. The second touch sensing electrodes TE2 may include a plurality of long-and-straight shaped sensing electrodes extending in the same direction (such as a second direction D2). The removal area may be defined as non-conductive areas 136 to block adjacent sensing electrodes electrically. Each sensing electrode has a patterned layer PL. The second touch sensing electrodes TE2 and the patterned layers PL have the corresponding patterns. In one embodiment, the second touch-sensing electrodes TE2 and the patterned layers PL have substantially the same pattern. The second touch sensing electrodes TE2 and the patterned layers PL have mutually aligned sides. The first touch sensing electrodes TE1 and the second touch sensing electrodes TE2 are staggered with each other in structure, and the first touch sensing electrodes TE1 and the second touch sensing electrodes TE2 can form a touch sensing electrode TE to enable inductive touch or control gestures and so on.

Figure 6A:
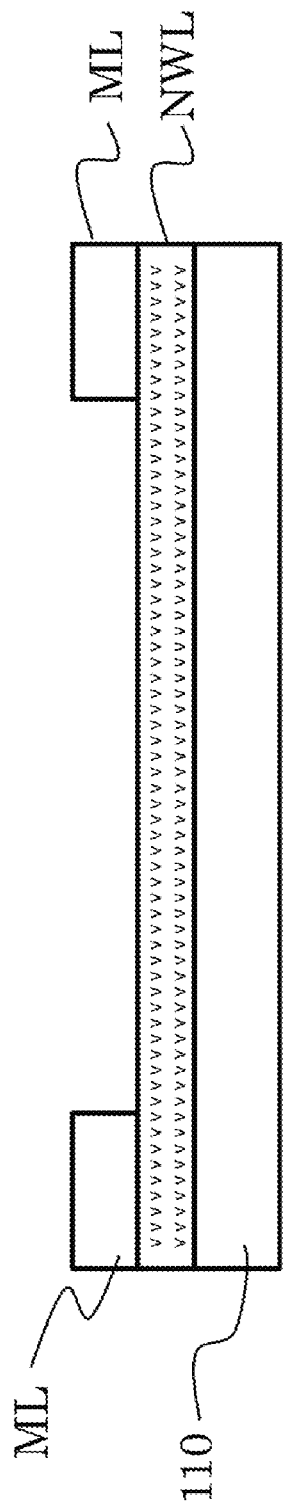
FIG. 6A to FIG. 6C are schematic views of steps of a manufacturing method for a touch panel according to some embodiments of the present disclosure.
Figure 6B:
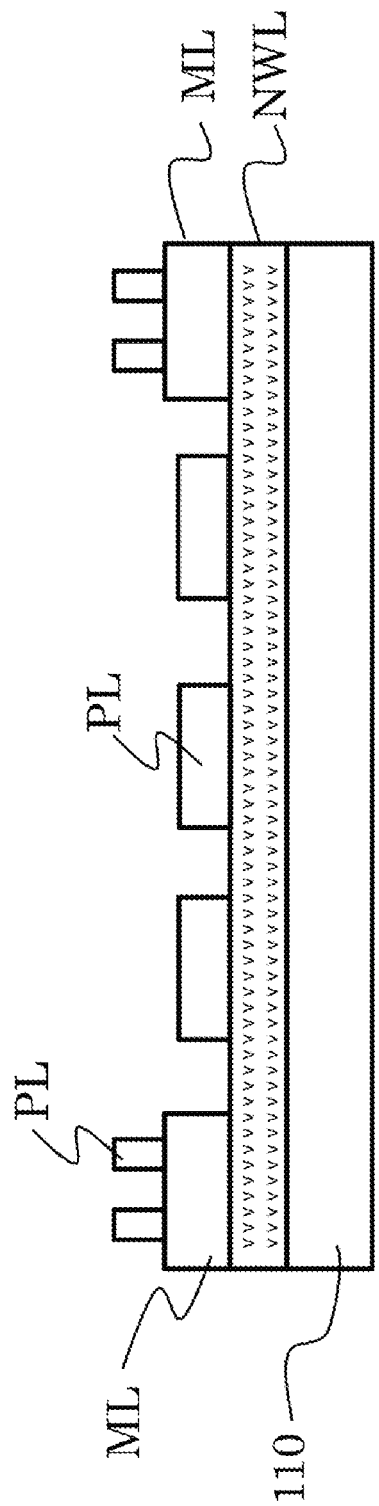
Figure 6C:
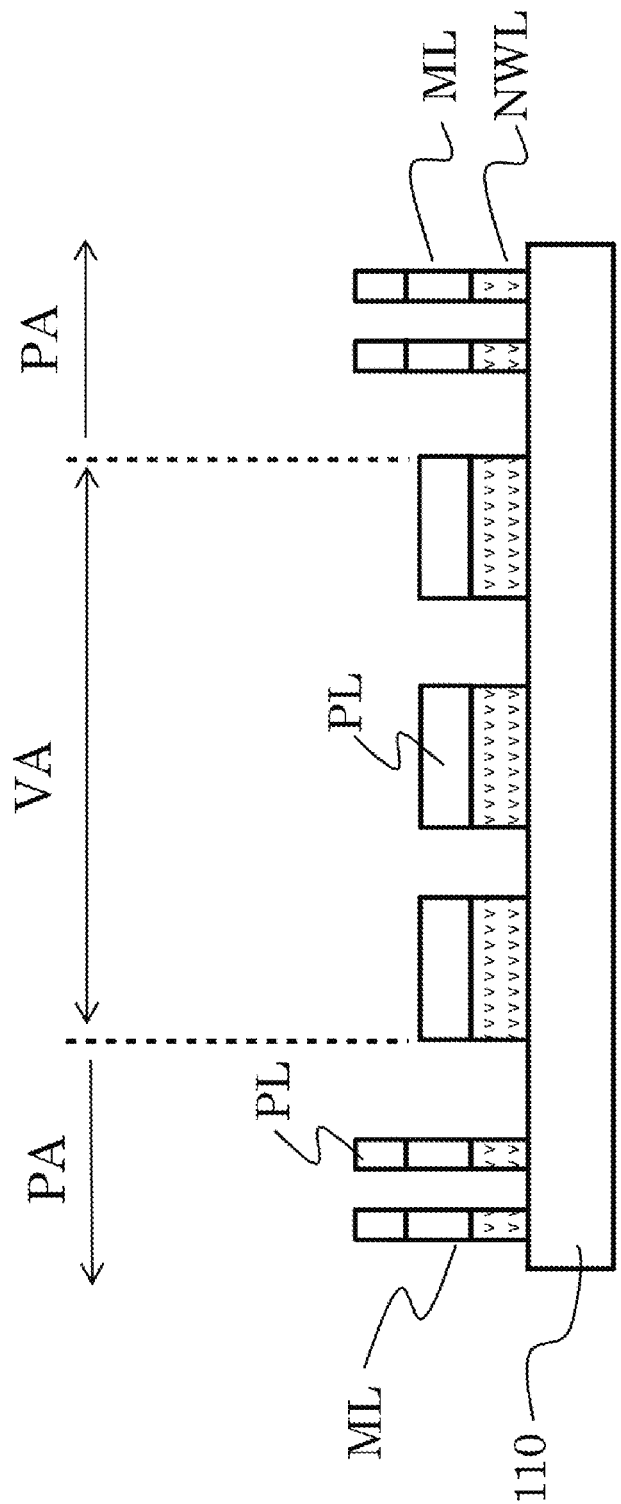

Please refer to FIG. 6A to FIG. 6C, the touch panel in another embodiment of the present disclosure can be manufactured in the following manner. Firstly, a substrate 110 is provided, which has a peripheral area PA and a display area VA defined in advance. Next, a metal nanowire layer NWL is formed in the peripheral area PA and the display area VA. Then, a metal layer ML is formed in the peripheral area PA (as shown in FIG. 6A). A patterned layer PL is then formed on the metal nanowire layer NWL (as shown in FIG. 6B). After that, patterning is performed according to the patterned layer PL to form a patterned metal layer ML and a patterned metal nanowire layer NWL (as shown in FIG. 6C). The difference between the present embodiment and the foregoing embodiment is at least the forming order of the metal layer ML and the metal nanowire layer NWL. In other words, in the present embodiment, the metal nanowire layer NWL is firstly manufactured, and then the metal layer ML is manufactured. The specific embodiment of this step could refer to the foregoing. For example, in the method of forming the patterned layer PL, the patterned layer PL can be disposed on the metal layer ML and the metal nanowire layer NWL by using a flexographic printing process.

In this embodiment, the material can also be directly formed on workpieces in a patterned manner by using flexographic printing technology, such as on the metal layer ML of this embodiment. In this embodiment, a photoresist material is used to manufacture the patterned layer PL. Specifically, a photoresist having a viscosity of about 300 to 1000 cp and solid content of about 50 to 80% can be selected, such as a resin-based phenolic resin, acrylic resin, epoxy resin series and so on. Thermosetting materials can be selected to use, and the thermosetting conditions could be a curing temperature less than 130 degrees and a curing time less than 60 seconds. In one embodiment, a photoresist with the properties of acid etching resistance can be selected to perform the subsequent etching process directly.

After the patterning step, a step of removing the patterned layer PL is further included. In the specific embodiment, it can be stripped by organic solvents or alkaline film removers, such as KOH, $K_2CO_3$, propylene glycol methyl ether acetate (PGMEA), and so on. In other words, after the above etching step, the patterned layer PL is removed without remaining in the structure of the product.

For other detailed manufacturing methods of the present embodiment, please refer to the above description, and the details are not described herein again.

Figure 7:
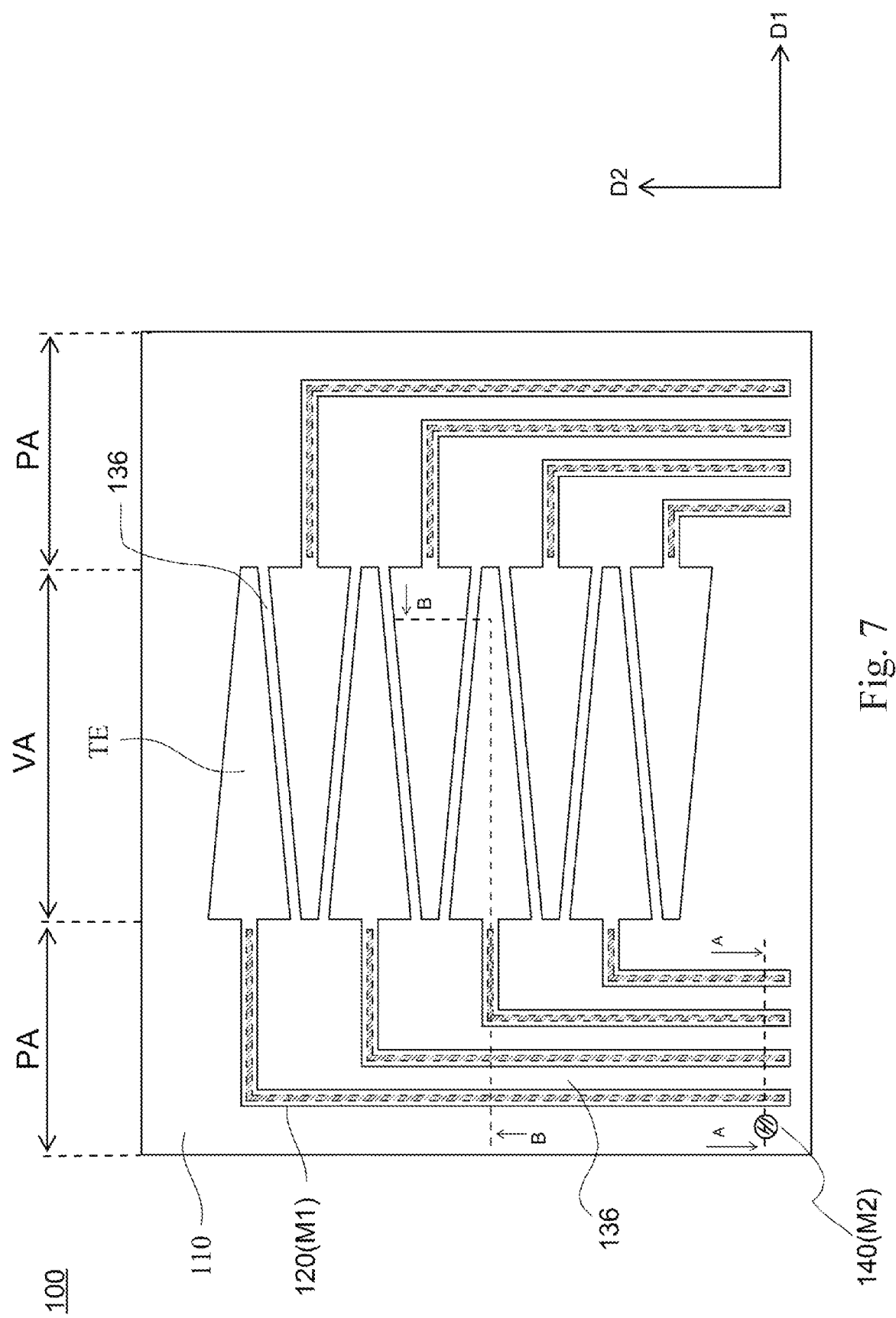
Figure 7A:
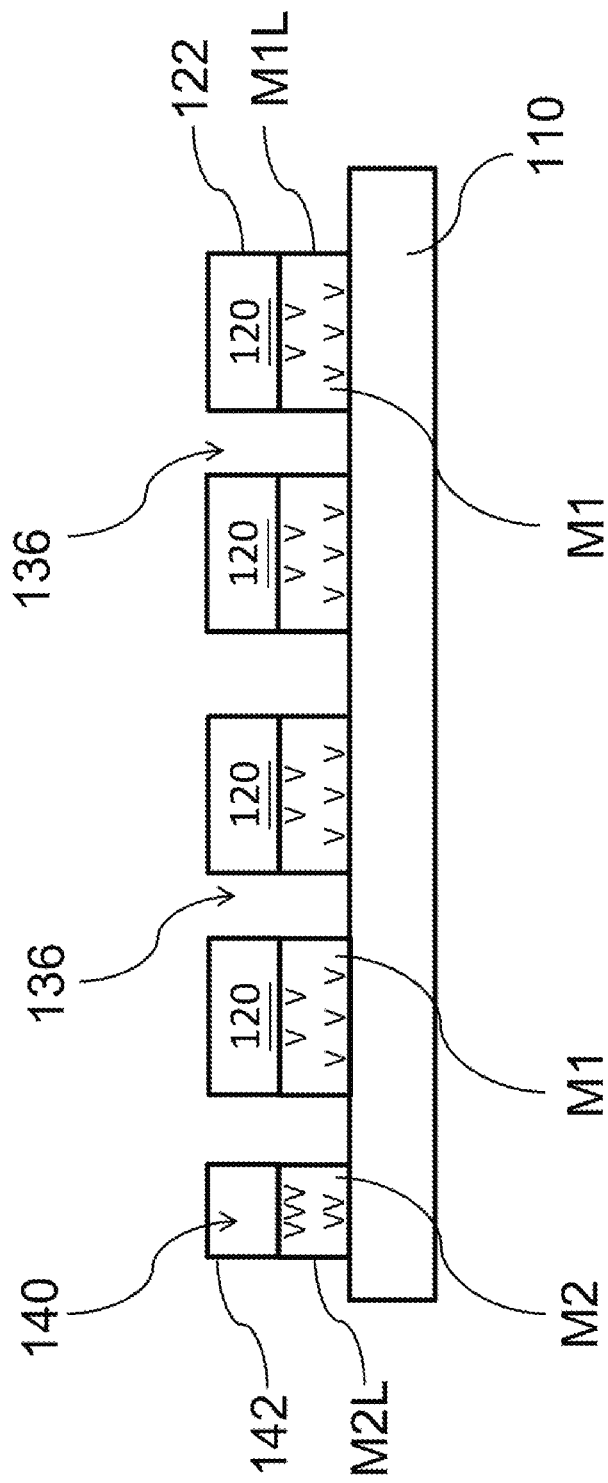
FIG. 7A is a schematic cross-sectional view taken along line A-A of FIG. 7.
Figure 7B:
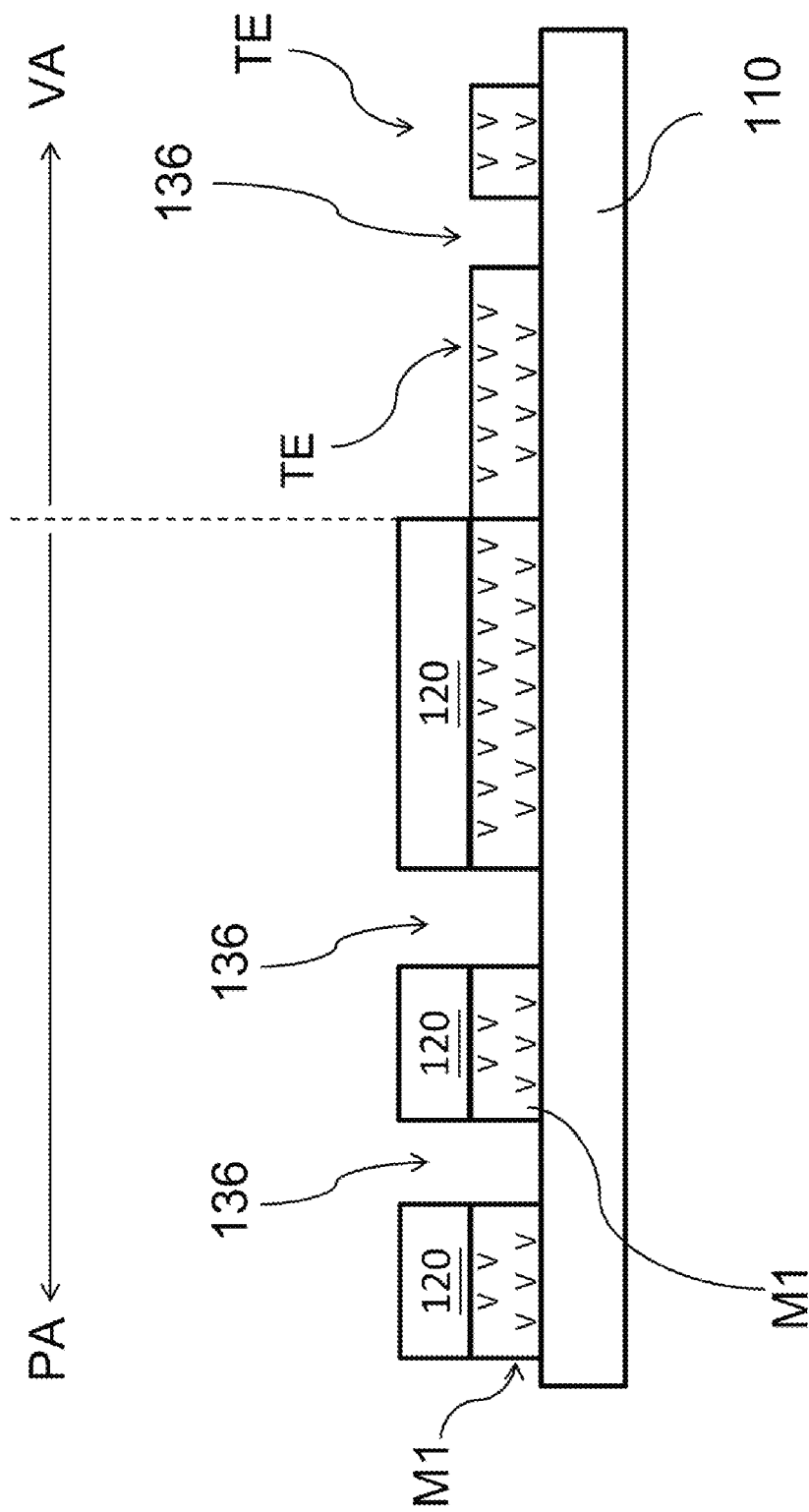
FIG. 7B is a schematic cross-sectional view taken along line B-B of FIG. 7.

Please refer to FIG. 7, which shows the touch panel 100 (the patterned layer PL has been removed) according to the completed embodiment of the present disclosure. FIGS. 7A and 7B are cross-sectional views taken along lines A-A and B-B in FIG. 7, respectively. Aspects of the peripheral area PA can be seen in the cross-sectional view taken along A-A, and aspects of the peripheral area PA and the display area VA can be seen in the cross-sectional view taken along B-B. As shown in FIGS. 7A and 7B, the metal nanowire layer NWL and metal layer ML located in the peripheral area PA can form voids (that is, the non-conductive areas 136) after the etching step (such as the foregoing one-step etching). The etching layer is formed in the peripheral area PA and is composed of the patterned metal nanowire layer NWL. The peripheral wires 120 are composed of the metal layer ML. Because the etching layer is located between the peripheral wires 120 and the substrate 110, it can be referred to as a first interlayer M1. In other words, the first interlayer M1, which is under the peripheral wires 120, is also patterned. Non-conductive areas 136 are between adjacent peripheral wires 120. Furthermore, the sides 122 of the peripheral wires 120 and sides M1L of the first interlayer M1 are common etching surfaces and are aligned with each other. That is to say, the sidewalls of the patterned layer PL are used as a reference in the patterning step. The sides 122 of the peripheral wires 120 and the sides M1L of the first interlayer M1 are formed according to the sidewalls of the patterned layer PL in the same etching step. Because the structural layer of the peripheral area PA is patterned in the same step, the traditional alignment step can be omitted, thereby reducing or avoiding the need to set the alignment bit error area in the process. Thus, the width of the peripheral area PA is reduced and the narrow bezel requirement of touch panel/touch displays is met.

In another embodiment, the etching layer composed of the metal nanowire layer NWL and peripheral wires 120 and the mark 140 composed of the metal layer ML may be provided in the peripheral area PA. The etching layer may include the first interlayer M1 and the second interlayer M2. The first interlayer M1 is disposed between the peripheral wires 120 and the substrate 110. The second interlayer M2 is disposed between the mark 140 and the substrate 110. The sides 142 of the mark 140 and sides M2L of the second interlayer M2 are common etching surfaces and are aligned with each other.

As shown in FIG. 7B, in the display area VA, the metal nanowire layer NWL also uses the patterned layer PL as an etching mask, and touch sensing electrodes TE are formed in the foregoing patterning step. In the present embodiment, the metal nanowire layer NWL is patterned to form gaps to form non-conductive areas 136 between adjacent touch sensing electrodes TE. In addition, touch sensing electrodes TE can be electrically connected to the peripheral wires 120 through the metal nanowire layer NWL extending to the peripheral area PA.

Figure 8:
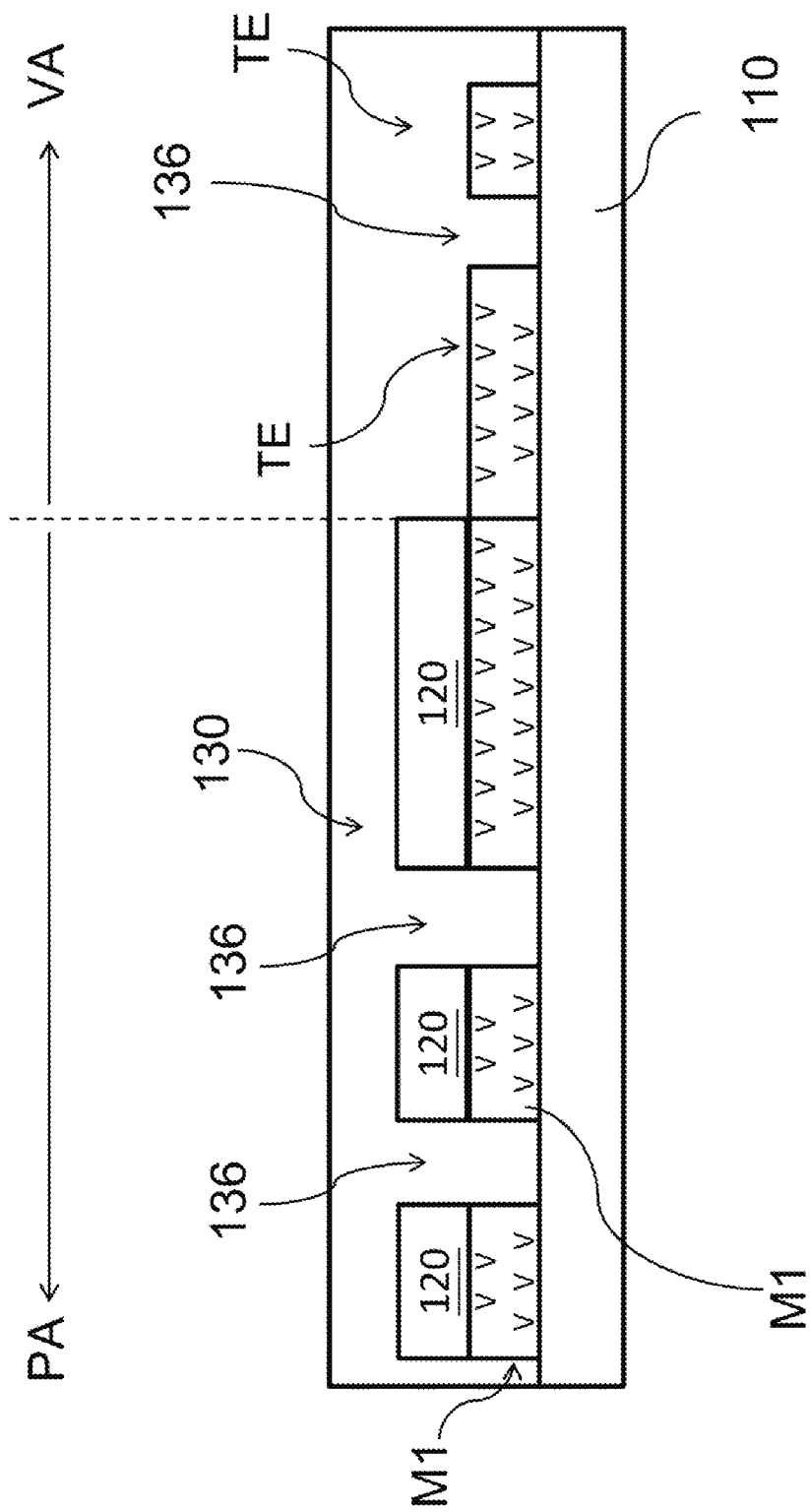

In another embodiment, the foregoing touch panel 100 may include a film layer 130 or a protective layer. For example, FIG. 8 is a schematic view of the film layer 130 formed on the embodiment shown in FIG. 7B. In one embodiment, the film layer 130 covers the touch panel 100 comprehensively. For example, the film layer 130 can be disposed in the display area VA and the peripheral area PA to cover the touch sensing electrodes TE, peripheral wires 120, and/or marks 140. As shown in the figure, in the peripheral area PA, the film layer 130 covers the first peripheral wires 120, and the film layer 130 is filled into the non-conductive areas 136 between adjacent peripheral wires 120. That is to say, the non-conductive areas 136 between the adjacent peripheral wires 120 have a filling layer, which is made of the same material as the film layer 130. In addition, in terms of a single set of the corresponding peripheral wire 120 and first interlayer M1, the film layer 130 would surround the single set of the upper corresponding peripheral wire 120 and the lower corresponding first interlayer M1. Similarly, in terms of a single set of the corresponding mark 140 and second interlayer M2, the film layer 130 would surround the single set of the upper corresponding mark 140 and the lower corresponding second interlayer M2.

In the display area VA, the film layer 130 covers the touch sensing electrodes TE, and the film layer 130 is filled into the non-conductive areas 136 between adjacent touch sensing electrodes TE. That is to say, the non-conductive areas 136 between the adjacent touch sensing electrodes TE have a filling layer, which is made of the same material as the film layer 130, to isolate the adjacent touch sensing electrodes TE.

In some embodiments of the present disclosure, the material of the film layer 130 could be non-conductive resin or other organic materials. For example, the film layer 130 could be polyethylene (PE), polypropylene (PP), polyethylene polyvinyl butyral (PVB), polycarbonate (PC), acrylonitrile butadiene styrene (ABS), poly(3,4-ethylenedioxythiophene) (PEDOT), poly(styrene sulfonic acid) (PSS), ceramic materials, and so on. In one embodiment of the present disclosure, the film layer 130 could be the following polymers, but is not limited thereto: polyacrylic resin, such as polymethacrylates (such as poly(methyl methacrylate)), polyacrylates, and polyacrylonitrile; polymers with high aromaticity, such as phenolic resin or cresol-formaldehyde, polystyrene, polyvinyltoluene, polyvinylxylene, polyimide, polyamide, polyamideimide, polyetherimide, polysulfide, polysulfone, polyphenylene group and polypheylene ether; polyurethane (PU); epoxy resin; polyolefin, (such as polypropylene, polymethylpentene and cycloolefins); cellulose; polysiloxane and other silicon-containing polymers (such as polysilsesquioxane and polysilane); polyvinyl chloride (PVC); polyacetate; polynorbornene; synthetic rubber (such as ethylene-propylene rubber (EPR), styrene-butadiene rubber (SBR), EPDM (ethylene-Propylene-Diene Monomer; EPDM); and fluorine-containing polymer (such as polyvinylidene fluoride, polytetrafluoroethylene (TFE) or polyhexafluoropropylene); copolymers of fluoro olefin and hydrocarbon olefin and so on. In other embodiments, inorganic materials such as silicon dioxide, mullite, alumina, SiC, carbon fiber, $MgO-Al_2O_3-SiO_2$, $Al_2O_3-SiO_2$, or $MgO-Al_2O_3-SiO_2-Li_2O$ could be used. In some embodiments of the present disclosure, the film layer 130 is formed of insulating materials. In some embodiments of the present disclosure, the film layer 130 may be formed by the methods of spin coating, spray coating, printing, or the like. In some embodiments, the thickness of the film layer 130 is about 20 nm to 10 μm, or 50 nm to 200 nm, or 30 to 100 nm. For example, the thickness of the film layer 130 may be about 90 nm or 100 nm.

In addition, similar to the foregoing, a composite structure can be formed by the film layer 130 and the metal nanowires (such as touch-sensing electrodes TE) to have certain specific chemical, mechanical, and optical properties. The film layer 130 may also have properties such as providing adhesion between the metal nanowires and the substrate 110 or the better physical-mechanical strength, and can also be referred to as a matrix. It is worth explaining that the drawings in the present disclosure show the film layer 130 and the touch sensing electrodes TE as different layer structures, but the polymer used to make the film layer 130 can infiltrate into between the metal nanowires before being cured or in the pre-cured state to form a filler. The metal nanowires would be embedded in the film layer 130 when the polymer is cured. In other words, the present disclosure does not specifically limit the structure between the film layer 130 and the metal nanowire layer NWL (for example, the touch sensing electrodes TE). It is worth explaining that the film layer 130 or the protective layer could be applied to the embodiments of the present disclosure, and is not limited to the embodiment shown in FIG. 7B.

Figure 9:
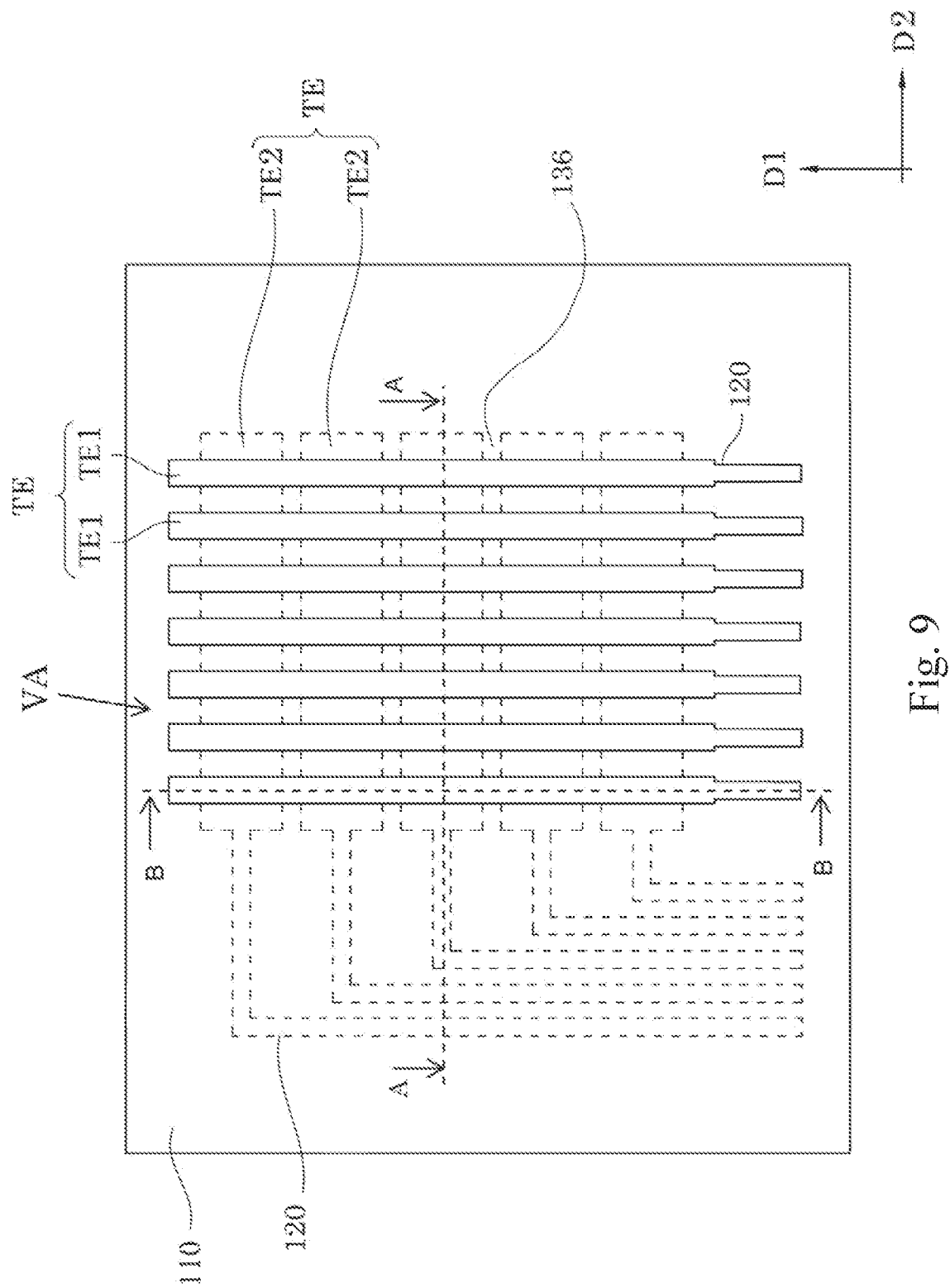
Figure 10:
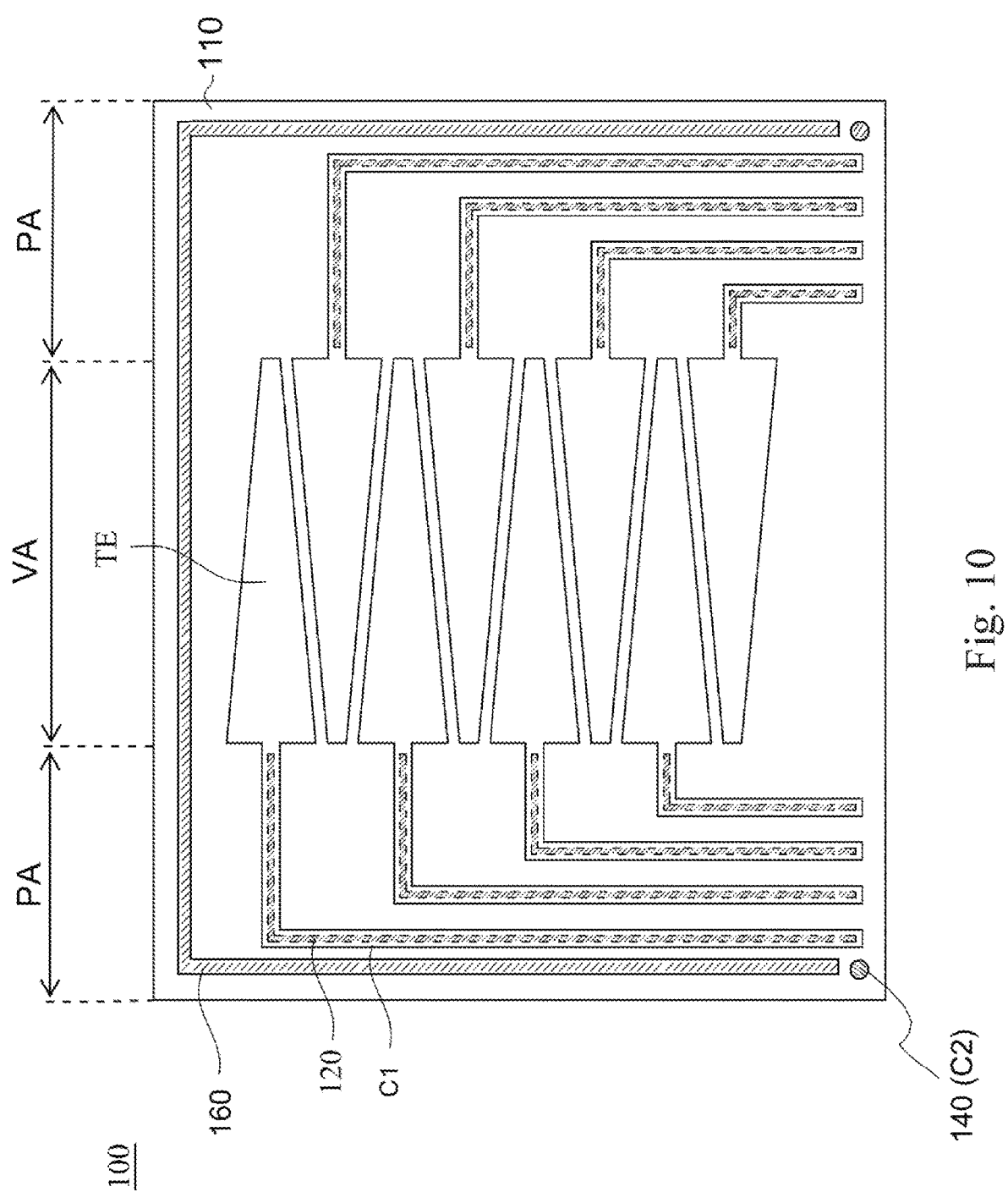

FIG. 9 shows a double-sided touch panel manufactured in the embodiment of the present disclosure, which can be manufactured according to the following method. Firstly, a substrate 110 is provided, which has a predefined peripheral area PA and display area VA defined in advance. Then, metal nanowire layer NWL is formed on the first surface and the opposite second surface (such as the upper surface and the lower surface) of substrate 110, respectively. The metal nanowire layers NWL are in the peripheral area PA and display area VA of the first surface and the second surface. Then, the metal layer ML is formed, and the metal layer ML is located in the peripheral area PA. Subsequently, the patterned layer PL is formed on the metal nanowire layer NWL and the metal layer ML on the first surface and the second surface, respectively. Then, the first surface and the second surface are patterned according to the patterned layer PL to form first touch electrodes TE1, second touch electrodes TE2 and peripheral wires 120 on the first surface and the second surface. The peripheral wires 120 would cover the first interlayer M1. The embodiment of the present disclosure may further include removing the patterned layer PL. For simplicity, the first interlayer M1 is not shown in FIG. 9.

For the specific embodiment of this step, please refer to the foregoing. For example, the patterned layer PL may be formed by using a flexography process to provide the patterned layer PL on the metal nanowire layer NWL and the metal layer ML on the first surface and the second surface, respectively. Since the present embodiment does not need to go through a photolithography process (exposure development, etc.), there is no problem of interactions/interferences of the double-sided process, which is beneficial to simplify the process and improve the yield.

Figure 9A:
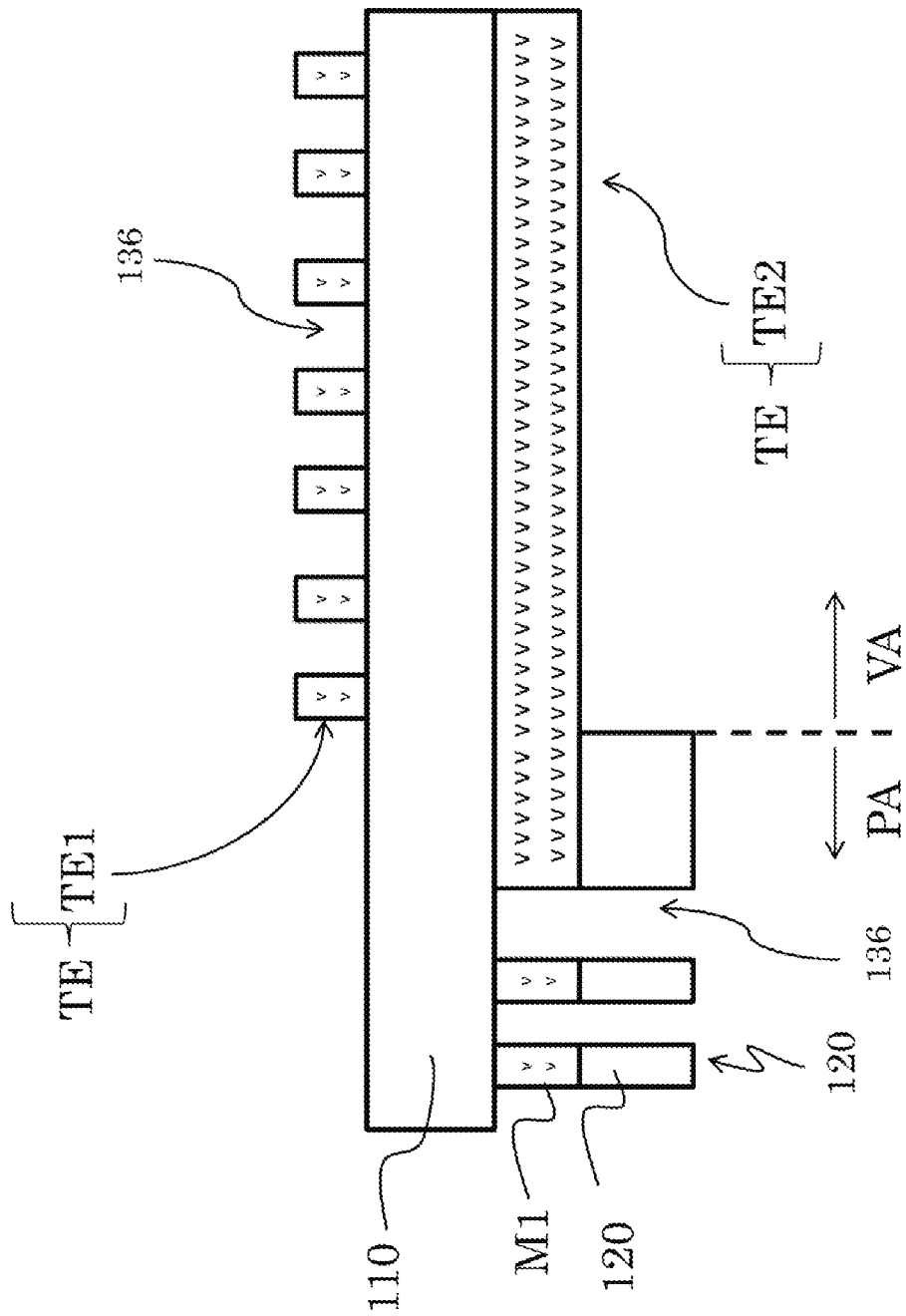
FIG. 9A is a schematic cross-sectional view taken along line A-A of FIG. 9.

Please refer to FIG. 9 and FIG. 9A, the first touch electrodes TE1 are formed on one side of the substrate 110 (such as upper surface), and the second touch electrodes TE2 are formed on the other side of the substrate 110 (such as lower surface), so that the first touch electrodes TE1 and the second touch electrodes TE2 are electrically insulated from each other. The peripheral wires 120 electrically connected to the first touch electrodes TE1 cover the first interlayer M1. Similarly, the peripheral wires 120 connected to the second touch electrodes TE2 cover the corresponding first interlayer M1. The first touch electrodes TE1 are a plurality of longitudinal electrodes arranged along the first direction D1, and the second touch electrodes TE2 are a plurality of longitudinal electrodes arranged along the second direction D2. As shown in the figure, the longitudinal touch sensing electrodes TE1 and the longitudinal touch sensing electrodes TE2 extend in different directions and are staggered with one other. The first touch sensing electrodes TE1 and the second touch sensing electrodes TE2 can be used to transmit control signals and receive touch sensing signals, respectively. Therefore, the touching position can be obtained by detecting the signal change (such as capacitance variation) between the first touch sensing electrodes TE1 and the second touch sensing electrodes TE2. With this arrangement, users can perform touch sensing at various points on the substrate 110. The touch panel 100 of the present embodiment may further include film layers 130, which comprehensively covers the touch panel 100. In other words, the film layers 130 are provided both on the upper side and the lower side of the substrate 110. The film layers 130 cover the first touch electrodes TE1, the second touch electrodes TE2, and the peripheral wires 120. The film layers 130 also cover and fill into the non-conductive areas 136, which are on the upper of the substrate 110 and the lower of the substrate 110.

Similar to the previous embodiment, any surface of the substrate 110 (such as the upper surface or the lower surface) may further include marks 140 and a second interlayer M2.

FIG. 10 is a schematic top view of a touch panel 100 according to some embodiments of the present disclosure. This embodiment is similar to the previous embodiment, the main difference is that, in this embodiment, the touch panel 100 further includes a mask wire 160 disposed in the peripheral area PA. The mask wire 160 mainly surrounds the touch sensing electrodes TE and peripheral wires 120. The mask wire 160 extends to the bonding area BA and is electrically connected to the ground terminal on the flexible printed circuit board 170. Therefore, the mask wire 160 can shield or eliminate signal interference or electrostatic discharge (ESD) protection, especially small current changes caused by human hands touching the connecting wires around the touch device.

According to the foregoing production method without removing the patterned layer PL, the mask wire 160 and the peripheral wires 120 could be made of the same, metal layer ML (that is, the mask wire 160 and the peripheral wires 120 are made from the same metal material, such as the foregoing electroless copper plating layer). The upper layer is made of the metal nanowire layer NWL (also referred to as the third covering layer) and the patterned layer PL, and the metal nanowire layer NWL is made by an etching step in accordance with the pattern of the patterned layer PL. It can also be understood that the mask wire 160 is a composite structure layer including the patterned layer PL, the metal nanowire layer NWL, and the metal layer ML. For details, refer to the description of the embodiments shown in FIGS. 2A and 2B. In addition, according to the foregoing manufacturing method of removing the patterned layer PL, the mask wire 160 and the peripheral wires 120 may be made of the same, metal layer ML (that is, the mask wire 160 and the peripheral wires 120 are made from the same metal material, such as the foregoing electroless copper plating layer). The mask wire 160 and the peripheral wires 120 are made by an etching step in accordance with the pattern of the patterned layer PL, and then the patterned layer PL is removed. Therefore, it can also be understood that the mask wire 160 is a composite structure layer including the metal nanowire layer NWL (or the third covering layer) and the metal layer ML. For details, refer to the description of the embodiments shown in FIGS. 7A and 7B.

In some embodiments, the touch panel 100 described herein can be manufactured by a roll-to-roll process. The roll-to-roll coating process is a process used by conventional equipment, and the process can be fully automated. The process can significantly reduce the cost of manufacturing touch panels. The specific process of roll-to-roll coating is as follows. Firstly, a flexible substrate 110 is selected. The flexible substrate 110 is installed between two rollers, and motors are used to drive the rollers so that a continuous process can be performed upon the substrate 110 along the moving path between the two rollers. For example, a metal layer ML is deposited by using a plating tank, a metal nanowires-containing slurry is deposited on the surface of the substrate 110 by using a storage tank, a spray device, a brush coating device and the like, and then a curing step is applied to form a metal nanowire layer NWL. A patterned layer PL is formed with a pattern (for example using the foregoing flexography process) on the metal layer ML and/or the metal nanowire layer NWL. An etching bath or spraying etching liquid is used for patterning and other steps. Subsequently, the completed touch panel 100 is rolled out by the roller at the end of the production line to form a touch sensor tape.

The touch sensor tape of the embodiment may further include a film layer 130, which comprehensively covers the uncut touch panel 100 on the touch sensor tape. That is to say, the film layer 130 may cover a plurality of uncut touch panels 100 on the touch sensor tape, and then the touch sensor tape is cut and separated into individual touch panels 100.

In some embodiments of the present disclosure, the substrate 110 is preferably a transparent substrate. In detail, it can be a rigid transparent substrate or a flexible transparent substrate. The material can be selected from glass, acrylic (polymethylmethacrylate, PMMA), polyvinyl chloride (PVC), polypropylene (PP), polyethylene terephthalate (PET), polyethylene naphthalate (PEN), polycarbonate (PC), polystyrene (PS), cyclo olefin polymers (COP), cycloolefin copolymer (COC) and other transparent materials.

The order of multiple coating steps as required along the movement path of the substrate can be adjusted by the roll-to-roll production line or the coating steps can be incorporated into any number of additional platforms as required. For example, in order to achieve an appropriate post-treatment process, pressure rollers or plasma equipment can be installed in the production line.

In some embodiments, the formed metal nanowires may further undergo post-treatment to increase the electrical conductivity of the formed metal nanowires. The post-treatment may be a process step including heating, plasma, corona discharge, UV ozone, pressure, or a combination of the above processes. For example, after the step of curing to form the metal nanowire layer NWL, a roller may be used to apply pressure on the metal nanowire layer NWL. In one embodiment, a pressure of 50 to 3400 psi may be applied to the metal nanowire layer NWL by one or more rollers, preferably 100 to 1000 psi, 200 to 800 psi or 300 to 500 psi. The above step of applying pressure is preferably performed before the step of coating the film layer 130. In some embodiments, the post-treatment of heating and pressure can be performed simultaneously. In detail, pressure can be applied to the formed metal nanowires by one or more rollers as described above and heated at the same time. For example, the pressure applied by the roller is 10 to 500 psi, preferably 40 to 100 psi, at the same time, the roller is heated to between about 70° C. and 200° C., preferably between about 100° C. and 175° C., which can increase the conductivity of the metal nanowires. In some embodiments, the metal nanowires are preferably exposed to a reducing agent for post-treatment. For example, the metal nanowires composed of silver nanowires are preferably exposed to a silver reducing agent for post-treatment. The silver reducing agent includes borohydride, such as sodium borohydride, boron nitrogen compounds, such as dimethylamino benzaldehyde (DMAB), or gas reducing agents, such as hydrogen ($H_2$). The exposure time is about 10 seconds to about 30 minutes, preferably about 1 minute to about 10 minutes.

Other details of the embodiment are generally as described in the above embodiment and are not repeated herein.

The structures of the different embodiments of the present disclosure can be interchanged and are not limited to the above specific embodiments.

In some embodiments of the present disclosure, the mask for etching is selectively disposed at a predetermined position on the metal nanowire layer NWL and/or the metal layer ML by the direct arrangement of the patterned layer PL. In this case, no comprehensively patterned layer PL material is required, and also no additional patterning step is required for the material of the patterned layer PL, so manufacturing cost can be reduced.

In some embodiments of the present disclosure, the patterned layer PL is used as an etching mask to provide a two-layer structure (for example, the upper layer is metal nanowire layer NWL and the lower layer is metal layer ML; or the upper layer is metal layer ML and the lower layer is metal nanowire layer NWL). The two-layer structure can be etched at one time to make the peripheral wires and/or the marks in the peripheral area. In this case, the alignment bit error area reserved during the alignment process can be avoided, so the width of the peripheral area can be effectively reduced.

Although the present disclosure has been disclosed in various embodiments as above, it is not intended to limit the present disclosure. Those skilled in the art can make various modifications and retouching without departing from the spirit and scope of the present disclosure. The scope of protection shall be determined by the scope of the claim of the attached patent application.

What is claimed is:

1. A manufacturing method of a touch panel, comprising:
providing a substrate having a display area and a peripheral area;
disposing a metal layer and a metal nanowire layer, wherein:
a first portion of the metal nanowire layer is disposed in the display area,
a second portion of the metal nanowire layer and the metal layer are disposed in the peripheral area, and
disposing the metal layer and the metal nanowire layer comprises:
disposing the metal layer in the peripheral area, comprising:
forming the metal layer in the peripheral area and the display area; and
removing the metal layer disposed in the display area; and
subsequently disposing the metal nanowire layer in the display area and the peripheral area such that the first portion of the metal nanowire layer disposed in the display area is formed on the substrate and the second portion of the metal nanowire layer disposed in the peripheral area is formed on the metal layer;
disposing a patterned layer having a pattern; and
performing a patterning step according to the patterned layer, wherein the patterning step comprises forming the metal layer into multiple peripheral wires and simultaneously forming the second portion of the metal nanowire layer into multiple etching layers by using an etching solution configured to etch the metal layer and the metal nanowire layer.

2. The manufacturing method of the touch panel of claim 1, wherein:
the patterning step further comprises forming the first portion of the metal nanowire layer into a touch sensing electrode by using the etching solution,
the touch sensing electrode is disposed in the display area, and
the touch sensing electrode is electrically connected to the multiple peripheral wires.

3. The manufacturing method of the touch panel of claim 1, wherein disposing the patterned layer with the pattern comprises forming the patterned layer by flexographic printing, letterpress printing, gravure printing, or screen printing.

4. The manufacturing method of the touch panel of claim 1, wherein disposing the patterned layer with the pattern comprises disposing the patterned layer on the metal nanowire layer such that a composite structure is formed by the patterned layer and the metal nanowire layer.

5. The manufacturing method of the touch panel of claim 1, wherein:
the patterning step further comprises forming the metal layer into multiple marks by using the etching solution,
the multiple etching layers comprise multiple first coverings and multiple second coverings,
each of the multiple first coverings is disposed on a corresponding peripheral wire of the multiple peripheral wires, and
each of the multiple second coverings is disposed on a corresponding mark of the multiple marks.

6. The manufacturing method of the touch panel of claim 1, further comprising disposing a film layer.

7. The manufacturing method of the touch panel of claim 1, wherein the manufacturing method is performed on one side or on two opposite sides of the substrate.

8. The manufacturing method of the touch panel of claim 1, wherein:
the patterning step further comprises forming the metal layer into multiple marks by using the etching solution, the multiple etching layers comprise multiple first interlayers and multiple second interlayers, each of the multiple first interlayers is disposed between a corresponding peripheral wire of the multiple peripheral wires and the substrate, and each of the multiple second interlayers is disposed between a corresponding mark of the multiple marks and the substrate.

9. The manufacturing method of the touch panel of claim 8, further comprising removing the patterned layer after the patterning step.

10. A touch panel, comprising:

a substrate having a display area and a peripheral area;

multiple peripheral wires disposed in the peripheral area;

multiple first coverings covering the multiple peripheral wires;

multiple marks disposed in the peripheral area;

multiple second coverings covering the multiple marks, wherein the multiple second coverings comprise metal nanowires, wherein:

the multiple second coverings have sides, and the sides of the multiple second coverings and sides of the multiple marks define common etching surfaces;

a touch sensing electrode disposed in the display area, wherein:

the touch sensing electrode is electrically connected to the multiple peripheral wires, and the multiple first coverings and the touch sensing electrode comprise metal nanowires; and a patterned layer disposed on the multiple first coverings and the touch sensing electrode, wherein:

the patterned layer has printing sides, and the common etching surfaces and the printing sides are aligned with each other.

11. The touch panel of claim 10, wherein:

a first composite structure is defined by the patterned layer and the multiple first coverings, or a second composite structure is defined by the patterned layer and the touch sensing electrode.

12. The touch panel of claim 10, wherein:

the multiple first coverings have sides, the sides of the multiple first coverings and sides of the multiple peripheral wires define common etching surfaces, and the common etching surfaces and the printing sides are aligned with each other.

13. The touch panel of claim 10, further comprising a film layer.

14. The touch panel of claim 10, wherein the multiple peripheral wires and the multiple marks are made of metal materials.

* * * * *